US011332577B2

(12) United States Patent
Hampson et al.

(10) Patent No.: US 11,332,577 B2
(45) Date of Patent: May 17, 2022

(54) BINDERS

(71) Applicants: Knauf Insulation SPRL, Visé (BE); Knauf Insulation, Inc., Shelbyville, IN (US)

(72) Inventors: Carl Hampson, St. Helens-Merseyside (GB); Richard Hand, St. Helens-Merseyside (GB); James Robinson, St. Helens-Merseyside (GB)

(73) Assignees: Knauf Insulation SPRL, Vise (BE); Knauf Insulation, Inc., Shelbyville, IN (US)

( * ) Notice: Subject to any disclaimer, the term of this patent is extended or adjusted under 35 U.S.C. 154(b) by 0 days.

(21) Appl. No.: 16/223,358

(22) Filed: Dec. 18, 2018

(65) Prior Publication Data

US 2019/0119446 A1    Apr. 25, 2019

Related U.S. Application Data

(63) Continuation of application No. 15/310,837, filed as application No. PCT/EP2015/060951 on May 19, 2015, now abandoned.

(30) Foreign Application Priority Data

May 20, 2014    (GB) ..................... 1408909

(51) Int. Cl.
| | |
|---|---|
| *C08G 73/02* | (2006.01) |
| *C09J 179/02* | (2006.01) |
| *C08L 79/02* | (2006.01) |
| *C08K 7/02* | (2006.01) |

(52) U.S. Cl.
CPC .............. *C08G 73/02* (2013.01); *C08K 7/02* (2013.01); *C08L 79/02* (2013.01); *C09J 179/02* (2013.01); *C08L 2201/56* (2013.01)

(58) Field of Classification Search
CPC ......... C09J 179/02; C08G 73/02; C08L 79/02
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace |
| 2,261,295 A | 11/1941 | Schlack |
| 2,362,086 A | 11/1944 | Eastes |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd |
| 3,222,243 A | 12/1965 | Gaston |
| 3,231,349 A | 1/1966 | Stalego |
| 3,232,821 A | 2/1966 | Banks |
| 3,297,419 A | 1/1967 | Eyre, Jr. |
| 3,513,001 A | 5/1970 | Woodhead |
| 3,551,365 A | 12/1970 | Matalon |
| 3,784,408 A | 1/1974 | Jaffe |
| 3,791,807 A | 2/1974 | Etzel |
| 3,802,897 A | 4/1974 | Bovier |
| 3,809,664 A | 5/1974 | Burr |
| 3,826,767 A | 7/1974 | Hoover |
| 3,856,606 A | 12/1974 | Fan |
| 3,867,119 A | 2/1975 | Takeo |
| 3,907,724 A | 9/1975 | Higginbottom |
| 3,911,048 A | 10/1975 | Nistri |
| 3,919,134 A | 11/1975 | Higginbottom |
| 3,922,466 A | 11/1975 | Bell |
| 3,955,031 A | 5/1976 | Jones |
| 3,956,204 A | 5/1976 | Higginbottom |
| 3,961,081 A | 6/1976 | McKenzie |
| 3,971,807 A | 7/1976 | Brack |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion of the International Searching Authority for PCT/EP2015/060951, dated Aug. 4, 2015, 13 pages.
International Search Report and Written Opinion for PCT/US2008/059730, dated Sep. 22, 2008.
International Search Report and Written Opinion for PCT/US2008/069046, dated Sep. 25, 2008.
International Search Report and Written Opinion for PCT/EP2011/059317, dated Jul. 15, 2011.
International Search Report for PCT/EP2008/060185, dated Oct. 23, 2008.
International Search Report for PCT/EP2011/057363, dated Sep. 5, 2011.
Ames, J.M., "The Maillard Browning Reaction—an Update,"Chemistry & Industry, No. 17, 1988, 4 pages.

(Continued)

*Primary Examiner* — Karuna P Reddy
(74) *Attorney, Agent, or Firm* — Knauf Insulation, Inc.; James K. Blodgett

(57) ABSTRACT

The present invention relates to a water-soluble carbohydrate-polyamino acid-based pre-reacted binder composition, a method of its manufacture, use of the pre-reacted binder composition, a method of manufacturing a collection of matter bound by a polymeric binder, a binder solution or dispersion comprising the pre-reacted binder composition, as well as products comprising the pre-reacted binder composition in a cured state.

10 Claims, 15 Drawing Sheets

(56) References Cited

U.S. PATENT DOCUMENTS

| | | |
|---|---|---|
| 4,014,726 A | 3/1977 | Fargo |
| 4,028,290 A | 6/1977 | Reid |
| 4,048,127 A | 9/1977 | Gibbons |
| 4,054,713 A | 10/1977 | Sakaguchi |
| 4,085,076 A | 4/1978 | Gibbons |
| 4,097,427 A | 6/1978 | Aitken |
| 4,107,379 A | 8/1978 | Stofko |
| 4,109,057 A | 8/1978 | Nakamura |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew |
| 4,186,053 A | 1/1980 | Krasnobajew |
| 4,201,247 A | 5/1980 | Shannon |
| 4,201,857 A | 5/1980 | Krasnobajew |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler |
| 4,464,523 A | 8/1984 | Neigel |
| 4,506,684 A | 3/1985 | Keritsis |
| 4,520,143 A | 5/1985 | Jellinek |
| 4,524,164 A | 6/1985 | Viswanathan |
| 4,631,226 A | 12/1986 | Jellinek |
| 4,654,259 A | 3/1987 | Stofko |
| 4,668,716 A | 5/1987 | Pepe |
| 4,692,478 A | 9/1987 | Viswanathan |
| 4,714,727 A | 12/1987 | Hume, III |
| 4,720,295 A | 1/1988 | Bronshtein |
| 4,734,996 A | 4/1988 | Kim |
| 4,754,056 A | 6/1988 | Ansel |
| 4,761,184 A | 8/1988 | Markessini |
| 4,780,339 A | 10/1988 | Lacourse |
| 4,828,643 A | 5/1989 | Newman |
| 4,845,162 A | 7/1989 | Schmitt |
| 4,906,237 A | 3/1990 | Johansson |
| 4,912,147 A | 3/1990 | Pfoehler |
| 4,918,861 A | 4/1990 | Carpenter |
| 4,923,980 A | 5/1990 | Blomberg |
| 4,950,444 A | 8/1990 | Deboufie |
| 4,988,780 A | 1/1991 | Das |
| 4,992,519 A | 2/1991 | Mukherjee |
| 5,001,202 A | 3/1991 | Denis |
| 5,013,405 A | 5/1991 | Izard |
| 5,032,431 A | 7/1991 | Conner |
| 5,037,930 A | 8/1991 | Shih |
| 5,041,595 A | 8/1991 | Yang |
| 5,089,342 A | 2/1992 | Dhein |
| 5,095,054 A | 3/1992 | Lay |
| 5,106,615 A | 4/1992 | Dikstein |
| 5,114,004 A | 5/1992 | Isono |
| 5,123,949 A | 6/1992 | Thiessen |
| 5,124,369 A | 6/1992 | Vandichel |
| 5,128,407 A | 7/1992 | Layton |
| 5,143,582 A | 9/1992 | Arkens |
| 5,151,465 A | 9/1992 | Le-Khac |
| 5,167,738 A | 12/1992 | Bichot |
| 5,198,492 A | 3/1993 | Stack |
| 5,217,741 A | 6/1993 | Kawachi |
| 5,218,048 A | 6/1993 | Abe |
| 5,240,498 A | 8/1993 | Matalon |
| 5,278,222 A | 1/1994 | Stack |
| 5,300,144 A | 4/1994 | Adams |
| 5,300,192 A | 4/1994 | Hansen |
| 5,308,896 A | 5/1994 | Hansen |
| 5,318,990 A | 6/1994 | Strauss |
| 5,336,753 A | 8/1994 | Jung |
| 5,336,755 A | 8/1994 | Pape |
| 5,336,766 A | 8/1994 | Koga |
| 5,340,868 A | 8/1994 | Strauss |
| 5,352,480 A | 10/1994 | Hansen |
| 5,367,849 A | 11/1994 | Bullock |
| 5,371,194 A | 12/1994 | Ferretti |
| 5,387,665 A | 2/1995 | Misawa |
| 5,389,716 A | 2/1995 | Graves |
| 5,393,849 A | 2/1995 | Srinivasan |
| 5,416,139 A | 5/1995 | Zeiszler |
| 5,421,838 A | 6/1995 | Gosset |
| 5,424,418 A | 6/1995 | Duflot |
| 5,434,233 A | 7/1995 | Kiely |
| 5,447,977 A | 9/1995 | Hansen |
| 5,470,843 A | 11/1995 | Stahl |
| 5,480,973 A | 1/1996 | Goodlad |
| 5,492,756 A | 2/1996 | Seale |
| 5,498,662 A | 3/1996 | Tanaka |
| 5,503,920 A | 4/1996 | Alkire |
| 5,534,612 A | 7/1996 | Taylor |
| 5,536,766 A | 7/1996 | Seyffer |
| 5,538,783 A | 7/1996 | Hansen |
| 5,543,215 A | 8/1996 | Hansen |
| 5,545,279 A | 8/1996 | Hall |
| 5,547,541 A | 8/1996 | Hansen |
| 5,547,745 A | 8/1996 | Hansen |
| 5,550,189 A | 8/1996 | Qin |
| 5,554,730 A | 9/1996 | Woiszwillo |
| 5,562,740 A | 10/1996 | Cook |
| 5,571,618 A | 11/1996 | Hansen |
| 5,578,678 A | 11/1996 | Hartmann |
| 5,580,856 A | 12/1996 | Prestrelski |
| 5,582,682 A | 12/1996 | Ferretti |
| 5,583,193 A | 12/1996 | Aravindakshan |
| 5,589,256 A | 12/1996 | Hansen |
| 5,589,536 A | 12/1996 | Golino |
| 5,607,759 A | 3/1997 | Hansen |
| 5,608,011 A | 3/1997 | Eck |
| 5,609,727 A | 3/1997 | Hansen |
| 5,614,570 A | 3/1997 | Hansen |
| 5,620,940 A | 4/1997 | Birbara |
| 5,621,026 A | 4/1997 | Tanaka |
| 5,633,298 A | 5/1997 | Arfaei |
| 5,641,561 A | 6/1997 | Hansen |
| 5,643,978 A | 7/1997 | Darwin |
| 5,645,756 A | 7/1997 | Dubin |
| 5,660,904 A | 8/1997 | Andersen |
| 5,661,213 A | 8/1997 | Arkens |
| 5,670,585 A | 9/1997 | Taylor |
| 5,672,418 A | 9/1997 | Hansen |
| 5,672,659 A | 9/1997 | Shalaby |
| 5,690,715 A | 11/1997 | Schiwek |
| 5,691,060 A | 11/1997 | Levy |
| 5,693,411 A | 12/1997 | Hansen |
| 5,719,092 A | 2/1998 | Arrington |
| 5,719,228 A | 2/1998 | Taylor |
| 5,733,624 A | 3/1998 | Syme |
| 5,756,580 A | 5/1998 | Natori |
| 5,763,524 A | 6/1998 | Arkens |
| 5,788,243 A | 8/1998 | Harshaw |
| 5,788,423 A | 8/1998 | Perkins |
| 5,807,364 A | 9/1998 | Hansen |
| 5,855,987 A | 1/1999 | Margel |
| 5,863,985 A | 1/1999 | Shalaby |
| 5,885,337 A | 3/1999 | Nohr |
| 5,895,804 A | 4/1999 | Lee |
| 5,905,115 A | 5/1999 | Luitjes |
| 5,916,503 A | 6/1999 | Rettenbacher |
| 5,919,528 A | 7/1999 | Huijs |
| 5,919,831 A | 7/1999 | Philipp |
| 5,922,403 A | 7/1999 | Tecle |
| 5,925,722 A | 7/1999 | Exner |
| 5,929,184 A | 7/1999 | Holmes-Farley |

(56) References Cited

U.S. PATENT DOCUMENTS

| | | | |
|---|---|---|---|
| 5,929,196 A | 7/1999 | Kissel |
| 5,932,344 A | 8/1999 | Ikemoto |
| 5,932,665 A | 8/1999 | Deporter |
| 5,932,689 A | 8/1999 | Arkens |
| 5,942,123 A | 8/1999 | McArdle |
| 5,954,869 A | 9/1999 | Elfersy |
| 5,977,224 A | 11/1999 | Cheung |
| 5,977,232 A | 11/1999 | Arkens |
| 5,981,719 A | 11/1999 | Woiszwillo |
| 5,983,586 A | 11/1999 | Berdan, II |
| 5,990,216 A | 11/1999 | Cai |
| 5,993,709 A | 11/1999 | Bonomo |
| 6,022,615 A | 2/2000 | Rettenbacher |
| 6,067,821 A | 5/2000 | Jackson |
| 6,071,549 A | 6/2000 | Hansen |
| 6,071,994 A | 6/2000 | Hummerich |
| 6,072,086 A | 6/2000 | James |
| 6,077,883 A | 6/2000 | Taylor |
| 6,090,925 A | 7/2000 | Woiszwillo |
| 6,114,033 A | 9/2000 | Ikemoto |
| 6,114,464 A | 9/2000 | Reck |
| 6,133,347 A | 10/2000 | Vickers, Jr |
| 6,136,916 A | 10/2000 | Arkens |
| 6,139,619 A | 10/2000 | Zaretskiy |
| 6,143,243 A | 11/2000 | Gershun |
| 6,171,444 B1 | 1/2001 | Nigam |
| 6,171,654 B1 | 1/2001 | Salsman |
| 6,180,037 B1 | 1/2001 | Anderson |
| 6,194,512 B1 | 2/2001 | Chen |
| 6,210,472 B1 | 4/2001 | Kwan |
| 6,221,958 B1 | 4/2001 | Shalaby |
| 6,221,973 B1 | 4/2001 | Arkens |
| 6,231,721 B1 | 5/2001 | Quick |
| 6,274,661 B1 | 8/2001 | Chen |
| 6,281,298 B1 | 8/2001 | Papsin, Jr. |
| 6,299,677 B1 | 10/2001 | Johnson |
| 6,299,936 B1 | 10/2001 | Reck |
| 6,307,732 B1 | 10/2001 | Tsubaki |
| 6,310,227 B1 | 10/2001 | Sarama |
| 6,313,102 B1 | 11/2001 | Colaco |
| 6,319,683 B1 | 11/2001 | James |
| 6,331,350 B1 | 12/2001 | Taylor |
| 6,331,513 B1 | 12/2001 | Zaid |
| 6,340,411 B1 | 1/2002 | Hansen |
| 6,348,530 B1 | 2/2002 | Reck |
| 6,365,079 B1 | 4/2002 | Winkler |
| 6,372,077 B1 | 4/2002 | Tecle |
| 6,379,739 B1 | 4/2002 | Formanek |
| 6,379,814 B1 | 4/2002 | Dupre |
| 6,395,856 B1 | 5/2002 | Petty |
| 6,403,665 B1 | 6/2002 | Sieker |
| 6,407,225 B1 | 6/2002 | Mang |
| 6,410,036 B1 | 6/2002 | De Rosa |
| 6,440,204 B1 | 8/2002 | Rogols |
| 6,441,122 B1 | 8/2002 | DeMott |
| 6,461,553 B1 | 10/2002 | Hansen |
| 6,468,442 B2 | 10/2002 | Bytnar |
| 6,468,730 B2 | 10/2002 | Fujiwara |
| 6,469,120 B1 | 10/2002 | Elfersy |
| 6,475,552 B1 | 11/2002 | Shah |
| 6,482,875 B2 | 11/2002 | Lorenz |
| 6,495,656 B1 | 12/2002 | Haile |
| 6,521,339 B1 | 2/2003 | Hansen |
| 6,525,009 B2 | 2/2003 | Sachdev |
| 6,538,057 B1 | 3/2003 | Wildburg |
| 6,547,867 B2 | 4/2003 | Rogols |
| 6,555,616 B1 | 4/2003 | Helbing |
| 6,559,302 B1 | 5/2003 | Shah |
| 6,562,267 B1 | 5/2003 | Hansen |
| 6,596,103 B1 | 7/2003 | Hansen |
| 6,613,378 B1 | 9/2003 | Erhan |
| 6,638,882 B1 | 10/2003 | Helbing |
| 6,638,884 B2 | 10/2003 | Quick |
| 6,699,945 B1 | 3/2004 | Chen |
| 6,706,853 B1 | 3/2004 | Stanssens |
| 6,719,862 B2 | 4/2004 | Quick |
| 6,730,730 B1 | 5/2004 | Hansen |
| 6,753,361 B2 | 6/2004 | Kroner |
| 6,818,694 B2 | 11/2004 | Hindi |
| 6,821,547 B2 | 11/2004 | Shah |
| 6,852,247 B2 | 2/2005 | Bytnar |
| 6,858,074 B2 | 2/2005 | Anderson |
| 6,861,495 B2 | 3/2005 | Barsotti |
| 6,864,044 B2 | 3/2005 | Ishikawa |
| 6,878,800 B2 | 4/2005 | Husemoen |
| 6,884,849 B2 | 4/2005 | Chen |
| 6,955,844 B2 | 10/2005 | Tagge |
| 6,962,714 B2 | 11/2005 | Hei |
| 6,989,171 B2 | 1/2006 | Portman |
| 6,992,203 B2 | 1/2006 | Trusovs |
| 7,018,490 B2 | 3/2006 | Hansen |
| 7,029,717 B1 | 4/2006 | Ojima |
| 7,067,579 B2 | 6/2006 | Taylor |
| 7,083,831 B1 | 8/2006 | Koch |
| 7,090,745 B2 | 8/2006 | Beckman |
| 7,141,626 B2 | 11/2006 | Rodrigues |
| 7,144,474 B1 | 12/2006 | Hansen |
| 7,195,792 B2 | 3/2007 | Boston |
| 7,201,778 B2 | 4/2007 | Smith |
| 7,201,825 B2 | 4/2007 | Dezutter |
| 7,202,326 B2 | 4/2007 | Kuroda |
| 7,241,487 B2 | 7/2007 | Taylor |
| 7,458,235 B2 | 12/2008 | Beaufils |
| 7,514,027 B2 | 4/2009 | Horres |
| 7,655,711 B2 | 2/2010 | Swift |
| 7,772,347 B2 | 8/2010 | Swift |
| 7,795,354 B2 | 9/2010 | Srinivasan |
| 7,803,879 B2 | 9/2010 | Srinivasan |
| 7,807,771 B2 | 10/2010 | Swift |
| 7,842,382 B2 | 11/2010 | Helbing |
| 7,854,980 B2 | 12/2010 | Jackson |
| 7,883,693 B2 | 2/2011 | Sehl |
| 7,888,445 B2 | 2/2011 | Swift |
| 7,947,765 B2 | 5/2011 | Swift |
| 8,114,210 B2 | 2/2012 | Hampson |
| 8,182,648 B2 | 5/2012 | Swift |
| 8,211,923 B2 | 7/2012 | Wagner |
| 8,372,900 B2 | 2/2013 | Shooshtari |
| 8,377,564 B2 | 2/2013 | Shooshtari |
| 8,501,838 B2 | 8/2013 | Jackson |
| 8,680,224 B2 | 3/2014 | Zhang |
| 8,691,934 B2 | 4/2014 | Helbing |
| 8,900,495 B2 | 12/2014 | Pacorel |
| 9,493,603 B2 * | 11/2016 | Mueller ............ C08G 16/00 |
| 2001/0017427 A1 | 8/2001 | Rosthauser |
| 2001/0046824 A1 | 11/2001 | Nigam |
| 2002/0000100 A1 | 1/2002 | Burg |
| 2002/0025435 A1 | 2/2002 | Hansen |
| 2002/0026025 A1 | 2/2002 | Kuo |
| 2002/0028857 A1 | 3/2002 | Holy |
| 2002/0032253 A1 | 3/2002 | Lorenz |
| 2002/0042473 A1 | 4/2002 | Trollsas |
| 2002/0091185 A1 | 7/2002 | Taylor |
| 2002/0096278 A1 | 7/2002 | Foster |
| 2002/0123598 A1 | 9/2002 | Sieker |
| 2002/0130439 A1 | 9/2002 | Kroner |
| 2002/0161108 A1 | 10/2002 | Schultz |
| 2002/0197352 A1 | 12/2002 | Portman |
| 2003/0005857 A1 | 1/2003 | Minami |
| 2003/0040239 A1 | 2/2003 | Toas |
| 2003/0044513 A1 | 3/2003 | Shah |
| 2003/0066523 A1 | 4/2003 | Lewis |
| 2003/0071879 A1 | 4/2003 | Swenson |
| 2003/0116294 A1 | 6/2003 | Kehrer |
| 2003/0134945 A1 | 7/2003 | Capps |
| 2003/0148084 A1 | 8/2003 | Trocino |
| 2003/0153690 A1 | 8/2003 | Husemoen |
| 2003/0185991 A1 | 10/2003 | Wigger |
| 2003/0203117 A1 | 10/2003 | Bartkowiak |
| 2004/0002567 A1 | 1/2004 | Chen |
| 2004/0019168 A1 | 1/2004 | Soerens |
| 2004/0024170 A1 | 2/2004 | Husemoen |
| 2004/0033269 A1 | 2/2004 | Hei |
| 2004/0033747 A1 | 2/2004 | Miller |

(56) References Cited

U.S. PATENT DOCUMENTS

| | | |
|---|---|---|
| 2004/0034154 A1 | 2/2004 | Tutin |
| 2004/0038017 A1 | 2/2004 | Tutin |
| 2004/0048531 A1 | 3/2004 | Belmares |
| 2004/0077055 A1 | 4/2004 | Fosdick |
| 2004/0079499 A1 | 4/2004 | Dezutter |
| 2004/0087024 A1 | 5/2004 | Bellocq |
| 2004/0087719 A1 | 5/2004 | Rautschek |
| 2004/0122166 A1 | 6/2004 | O'Brien-Bernini |
| 2004/0131874 A1 | 7/2004 | Tutin |
| 2004/0144706 A1 | 7/2004 | Beaufils |
| 2004/0152824 A1 | 8/2004 | Dobrowolski |
| 2004/0161993 A1 | 8/2004 | Tripp |
| 2004/0209851 A1 | 10/2004 | Nelson |
| 2004/0213930 A1 | 10/2004 | Halabisky |
| 2004/0220368 A1 | 11/2004 | Li |
| 2004/0249066 A1 | 12/2004 | Heinzman |
| 2004/0254285 A1 | 12/2004 | Rodrigues |
| 2004/0260082 A1 | 12/2004 | Van Der Wilden |
| 2005/0001198 A1 | 1/2005 | Bytnar |
| 2005/0017394 A1 | 1/2005 | Hochsmann |
| 2005/0027283 A1 | 2/2005 | Richard |
| 2005/0033037 A1 | 2/2005 | Trusovs |
| 2005/0048212 A1 | 3/2005 | Clamen |
| 2005/0059770 A1 | 3/2005 | Srinivasan |
| 2005/0171085 A1 | 8/2005 | Pinto |
| 2005/0196421 A1 | 9/2005 | Hunter |
| 2005/0202224 A1 | 9/2005 | Helbing |
| 2005/0208852 A1 | 9/2005 | Weber |
| 2005/0215153 A1 | 9/2005 | Cossement |
| 2005/0245669 A1 | 11/2005 | Clungeon |
| 2005/0275133 A1 | 12/2005 | Cabell |
| 2005/0288479 A1 | 12/2005 | Kuroda |
| 2006/0005580 A1 | 1/2006 | Espiard |
| 2006/0009569 A1 | 1/2006 | Charbonneau |
| 2006/0044302 A1 | 3/2006 | Chen |
| 2006/0099870 A1 | 5/2006 | Garcia |
| 2006/0111480 A1 | 5/2006 | Hansen |
| 2006/0124538 A1 | 6/2006 | Morcrette |
| 2006/0135433 A1 | 6/2006 | Murray |
| 2006/0141177 A1 | 6/2006 | Ligtenberg |
| 2006/0179892 A1 | 8/2006 | Horres |
| 2006/0188465 A1 | 8/2006 | Perrier |
| 2006/0198954 A1 | 9/2006 | Frechem |
| 2006/0231487 A1 | 10/2006 | Bartley |
| 2006/0252855 A1 | 11/2006 | Pisanova |
| 2006/0281622 A1 | 12/2006 | Maricourt |
| 2007/0006390 A1 | 1/2007 | Clamen |
| 2007/0009582 A1 | 1/2007 | Madsen |
| 2007/0027281 A1 | 2/2007 | Michl |
| 2007/0027283 A1 | 2/2007 | Swift et al. |
| 2007/0039520 A1 | 2/2007 | Crews |
| 2007/0082983 A1 | 4/2007 | Crews |
| 2007/0123679 A1 | 5/2007 | Swift |
| 2007/0123680 A1 | 5/2007 | Swift |
| 2007/0129522 A1 | 6/2007 | Burckhardt |
| 2007/0142596 A1 | 6/2007 | Swift |
| 2007/0158022 A1 | 7/2007 | Heep |
| 2007/0184740 A1 | 8/2007 | Keller |
| 2007/0191574 A1 | 8/2007 | Miller |
| 2007/0270070 A1 | 11/2007 | Othman |
| 2007/0287018 A1 | 12/2007 | Tutin |
| 2007/0292618 A1 | 12/2007 | Srinivasan |
| 2007/0292619 A1 | 12/2007 | Srinivasan |
| 2007/0298274 A1 | 12/2007 | Eriksson |
| 2008/0009209 A1 | 1/2008 | Clamen |
| 2008/0009616 A1 | 1/2008 | Frank |
| 2008/0051539 A1 | 2/2008 | Kelly |
| 2008/0060551 A1 | 3/2008 | Crews |
| 2008/0081138 A1 | 4/2008 | Moore |
| 2008/0108741 A1 | 5/2008 | Van Herwijnen |
| 2008/0160260 A1 | 7/2008 | Wada |
| 2008/0160302 A1 | 7/2008 | Asrar |
| 2008/0194738 A1 | 8/2008 | Crews |
| 2009/0169867 A1 | 7/2009 | Kelly |
| 2009/0170978 A1 | 7/2009 | Kelly |
| 2009/0227732 A1 | 9/2009 | Glockner |
| 2009/0301972 A1 | 12/2009 | Hines |
| 2009/0304919 A1 | 12/2009 | Huenig |
| 2009/0306255 A1 | 12/2009 | Patel |
| 2009/0324915 A1 | 12/2009 | Swift |
| 2010/0029160 A1 | 2/2010 | Srinivasan |
| 2010/0058661 A1 | 3/2010 | Jackson |
| 2010/0080976 A1 | 4/2010 | Jackson |
| 2010/0084598 A1 | 4/2010 | Jackson |
| 2010/0086726 A1 | 4/2010 | Jackson |
| 2010/0087571 A1 | 4/2010 | Jackson |
| 2010/0098947 A1 | 4/2010 | Inoue |
| 2010/0117023 A1 | 5/2010 | Dopico |
| 2010/0129640 A1 | 5/2010 | Kelly |
| 2010/0130649 A1 | 5/2010 | Swift |
| 2010/0175826 A1 | 7/2010 | Huenig |
| 2010/0210595 A1 | 8/2010 | Wagner |
| 2010/0222463 A1 | 9/2010 | Brady |
| 2010/0222566 A1 | 9/2010 | Fosdick |
| 2010/0282996 A1 | 11/2010 | Jaffrennou |
| 2010/0301256 A1 | 12/2010 | Hampson |
| 2010/0320113 A1 | 12/2010 | Swift |
| 2011/0021672 A1 | 1/2011 | Crews |
| 2011/0039111 A1 | 2/2011 | Shooshtari |
| 2011/0040010 A1 | 2/2011 | Shooshtari |
| 2011/0042303 A1 | 2/2011 | Shooshtari |
| 2011/0045966 A1 | 2/2011 | Shooshtari |
| 2011/0089074 A1 | 4/2011 | Jackson |
| 2011/0135937 A1 | 6/2011 | Swift |
| 2011/0190425 A1 | 8/2011 | Swift |
| 2011/0220835 A1 | 9/2011 | Swift |
| 2011/0256790 A1 | 10/2011 | Toas |
| 2011/0260094 A1 | 10/2011 | Hampson |
| 2011/0262648 A1 | 10/2011 | Lee |
| 2011/0263757 A1 | 10/2011 | Rand |
| 2011/0306726 A1 | 12/2011 | Bailey |
| 2012/0133073 A1 | 5/2012 | Pacorel |
| 2012/0156954 A1 | 6/2012 | Eckert |
| 2013/0029150 A1 | 1/2013 | Appley |
| 2013/0032749 A1 | 2/2013 | Jaffrennou |
| 2013/0047888 A1 | 2/2013 | Mueller |
| 2013/0059075 A1 | 3/2013 | Appley |
| 2013/0082205 A1 | 4/2013 | Mueller |
| 2013/0174758 A1 | 7/2013 | Mueller |
| 2013/0234362 A1 | 9/2013 | Swift |
| 2013/0236650 A1 | 9/2013 | Swift |
| 2013/0237113 A1 | 9/2013 | Swift |
| 2013/0244524 A1 | 9/2013 | Swift |
| 2014/0091247 A1 | 4/2014 | Jackson |
| 2014/0134909 A1 | 5/2014 | Guo |
| 2014/0357787 A1 | 12/2014 | Jobber |
| 2015/0299391 A1* | 10/2015 | Pacorel ............. C08G 73/0206 427/385.5 |

FOREIGN PATENT DOCUMENTS

| | | |
|---|---|---|
| BE | 1020570 A3 | 1/2014 |
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |
| EP | 770561 | 3/1957 |
| EP | 0044614 A2 | 1/1982 |
| EP | 0099801 | 2/1984 |
| EP | 2614388 | 10/1988 |
| EP | 354023 | 2/1990 |
| EP | 0461995 | 12/1991 |
| EP | 0524518 A2 | 1/1993 |
| EP | 0547819 A2 | 6/1993 |
| EP | 0583086 A1 | 2/1994 |

(56) References Cited

FOREIGN PATENT DOCUMENTS

| | | |
|---|---|---|
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| EP | 2386394 A1 | 11/2011 |
| EP | 2386605 A1 | 11/2011 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| TW | 201319192 A | 5/2013 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 A1 | 11/2011 |
| WO | 2011138459 A1 | 11/2011 |
| WO | WO-2011-138459 A1 * | 11/2011 |
| WO | 2013150123 | 10/2013 |
| WO | 2014086775 A2 | 6/2014 |
| WO | WO-2014086775 A2 * | 6/2014 |

OTHER PUBLICATIONS

"Gamma-aminopropyltrimethoxysilane,"Hawley's Condensed Chemical Dictionary, 14th Edition, John Wiley & Sons, Inc., 2002, 1 page.
Hodge, J.E., Chemistry of Browning Reactions in Model Systems, 1953, J. Agric. Food Chem., vol. 1, No. 15, pp. 928-943.
Agyei-Aye et al., "The Role of Anion in the Reaction of Reducing Sugars with Ammonium Salts," Carbohydrate Research 2002, 337: 2273-2277.
Laroque et al., "Kinetic study on the Maillard reaction. Consideration of sugar reactivity," Food Chemistry 2008, 111: 1032-1042.
Bjorksten et al., "Polyester Resin—Glass Fiber Laminates," Industrial and Engineering Chemistry (1954).
Dow Corning, "A Guide to Silane Solutions," 2005.
Knauf Data Sheet, 2006.
Molasses Corporation, United States Sugar Corporation, http://www.suga-lik.com/molasses/composition.html (Sep. 29, 2003).
Clamen, Guy, "Acrylic Thermosets: A Safe Alternative to Formaldehyde Resins," Nonwovens World, Apr.-May 2004, pp. 96-102.
Opposition to AU 2006272595, Amended Statement of Grounds and Particulars, issued from Australian Patent Office, Jul. 6, 2012, 22 pages.
Decision re Opposition to AU 2006272595, issued from Australian Patent Office, Aug. 14, 2015, 25 pages.
Opposition to EP 1732968, Notice of Opposition: Prior Art, Scope of the Patent, Reasons for the Opposition, issued from European Patent Office, Mar. 8, 2012, 18 pages.
Decision re Opposition to EP 1732968, issued from the European Patent Office, Nov. 14, 2014, 5 pages.
Opposition to EA 019802, submitted to Eurasian Patent Office on Dec. 26, 2014, 36 pages.
Decision re Opposition to EA 019802, issued by Eurasian Patent Office on Aug. 18, 2015, 15 pages.
Owens Corning Retiree Update: What Goes Around, Comes Around: A tale of Natural Binders, revised Mar. 20, 2013 p. 4.
A.P. Bryant, "The Terminology of Sugars," Industrial and Engineering Chemistry, vol. 26, No. 2, p. 231, Feb. 1934.
Food Flavor Chemistry, p. 162, Mar. 21, 2009 (English Abstract).
Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).
Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).

(56) References Cited

OTHER PUBLICATIONS

Residential Energy Conservation: vol. 1, Congress of the U.S., Office of Technology Assessment (Ed.), 357 pages. (Jan. 1, 1979).
Office action for co-pending U.S. Appl. No. 12/524,502 (9 pages)—dated Sep. 21, 2012.
Office action for co-pending U.S. Appl. No. 12/524,502 (9 pages)—dated Apr. 4, 2013.
Office action for co-pending U.S. Appl. No. 12/524,512 (7 pages)—dated Aug. 6, 2012.
Office action for co-pending U.S. Appl. No. 12/524,512 (9 pages)—dated Apr. 1, 2013.
Office action for co-pending U.S. Appl. No. 12/524,512 (14 pages)—dated Nov. 12, 2014.
Office action for co-pending U.S. Appl. No. 12/524,512 (9 pages)—dated Jul. 10, 2015.
Office action for co-pending U.S. Appl. No. 12/524,512 (10 pages)—dated Mar. 23, 2016.
Office action for co-pending U.S. Appl. No. 12/524,512 (13 pages)—dated Oct. 5, 2016.
Office action for co-pending U.S. Appl. No. 12/524,512 (13 pages)—dated Apr. 6, 2018.
Office action for co-pending U.S. Appl. No. 12/524,512 (15 pages)—dated Jan. 17, 2019.
Office action for co-pending U.S. Appl. No. 12/524,469 (7 pages)—dated Jun. 7, 2012.
Office action for co-pending U.S. Appl. No. 12/524,469 (8 pages)—dated Jan. 29, 2013.
Office action for co-pending U.S. Appl. No. 12/524,469 (7 pages)—dated Aug. 20, 2013.
Office action for co-pending U.S. Appl. No. 12/524,469 (9 pages)—dated Jun. 9, 2014.
Office action for co-pending U.S. Appl. No. 12/524,469 (9 pages)—dated Oct. 17, 2014.
Office action for co-pending U.S. Appl. No. 12/524,469 (9 pages)—dated Jul. 23, 2015.
Office action for co-pending U.S. Appl. No. 12/524,539 (13 pages)—dated Jun. 21, 2012.
Office action for co-pending U.S. Appl. No. 12/524,539 (13 pages)—dated Jun. 6, 2013.
Office action for co-pending U.S. Appl. No. 12/524,539 (12 pages)—dated Dec. 17, 2014.
Office action for co-pending U.S. Appl. No. 12/524,539 (7 pages)—dated Jul. 15, 2015.
Office action for co-pending U.S. Appl. No. 12/524,539 (7 pages)—dated Mar. 23, 2016.
Office action for co-pending U.S. Appl. No. 12/524,539 (7 pages)—dated Dec. 29, 2016.
Office action for co-pending U.S. Appl. No. 12/524,522 (4 pages)—dated Oct. 11, 2011.
Office action for co-pending U.S. Appl. No. 12/667,718 (5 pages)—dated Sep. 3, 2013.
Office action for co-pending U.S. Appl. No. 12/667,718 (6 pages)—dated Sep. 9, 2014.
Office action for co-pending U.S. Appl. No. 12/671,922 (10 pages)—dated Oct. 7, 2011.
Office action for co-pending U.S. Appl. No. 12/671,922 (10 pages)—dated May 10, 2012.
Office action for co-pending U.S. Appl. No. 12/671,922 (9 pages)—dated Sep. 23, 2014.
Office action for co-pending U.S. Appl. No. 12/671,922 (5 pages)—dated Apr. 4, 2016.
Office action for co-pending U.S. Appl. No. 13/388,408 (5 pages)—dated Aug. 15, 2013.
Office action for co-pending U.S. Appl. No. 13/371,829 (9 pages)—dated Dec. 20, 2012.
Office action for co-pending U.S. Appl. No. 13/371,829 (6 pages)—dated Jul. 12, 2013.
Office action for co-pending U.S. Appl. No. 13/371,829 (6 pages)—dated Aug. 12, 2014.
Office action for co-pending U.S. Appl. No. 13/637,794 (8 pages)—dated Aug. 12, 2013.
Office action for co-pending U.S. Appl. No. 13/637,794 (9 pages)—dated Mar. 26, 2014.
Office action for co-pending U.S. Appl. No. 13/696,439 (11 pages)—dated Jan. 8, 2014.
Office action for co-pending U.S. Appl. No. 13/696,452 (7 pages)—dated Jan. 13, 2015.
Office action for co-pending U.S. Appl. No. 13/696,452 (9 pages)—dated Oct. 27, 2015.
Office action for co-pending U.S. Appl. No. 13/702,144 (6 pages)—dated Jan. 10, 2014.
Office action for co-pending U.S. Appl. No. 13/702,144 (7 pages)—dated Jul. 29, 2014.
Office action for co-pending U.S. Appl. No. 13/823,818 (9 pages)—dated Mar. 26, 2015.
Office action for co-pending U.S. Appl. No. 13/866,368 (16 pages)—dated Aug. 29, 2013.
Office action for co-pending U.S. Appl. No. 13/866,368 (11 pages)—dated Apr. 16, 2014.
Office action for co-pending U.S. Appl. No. 13/866,368 (8 pages)—dated Aug. 21, 2014.
Office action for co-pending U.S. Appl. No. 13/866,419 (14 pages)—dated Sep. 20, 2013.
Office action for co-pending U.S. Appl. No. 13/866,419 (10 pages)—dated Apr. 25, 2014.
Office action for co-pending U.S. Appl. No. 13/866,419 (8 pages)—dated Oct. 9, 2014.
Office action for co-pending U.S. Appl. No. 13/866,419 (8 pages)—dated Sep. 25, 2015.
Office action for co-pending U.S. Appl. No. 13/868,233 (23 pages)—dated Aug. 13, 2013.
Office action for co-pending U.S. Appl. No. 13/868,233 (12 pages)—dated Apr. 15, 2014.
Office action for co-pending U.S. Appl. No. 13/868,233 (8 pages)—dated Oct. 7, 2014.
Office action for co-pending U.S. Appl. No. 13/868,233 (8 pages)—dated Jul. 16, 2015.
Office action for co-pending U.S. Appl. No. 13/868,238 (8 pages)—Jul. 16, 2014.
Office action for co-pending U.S. Appl. No. 12/976,379 (7 pages)—dated Jan. 10, 2012.
Office action for co-pending U.S. Appl. No. 12/976,379 (6 pages)—dated Jul. 27, 2012.
Office action for co-pending U.S. Appl. No. 12/976,379 (9 pages)—dated Mar. 7, 2013.
Office action for co-pending U.S. Appl. No. 12/976,379 (8 pages)—dated Aug. 20, 2013.
Office action for co-pending U.S. Appl. No. 12/599,858 (8 pages)—dated May 11, 2011.
Office action for co-pending U.S. Appl. No. 13/341,542 (8 pages)—dated Dec. 26, 2012.
Office action for co-pending U.S. Appl. No. 13/341,542 (7 pages)—dated Feb. 10, 2014.
Office action for co-pending U.S. Appl. No. 14/026,394 (6 pages)—dated Aug. 14, 2014.
Office action for co-pending U.S. Appl. No. 14/272,556 (14 pages)—dated Nov. 20, 2014.
Office action for co-pending U.S. Appl. No. 14/272,556 (12 pages)—dated Sep. 17, 2015.
Office action for co-pending U.S. Appl. No. 14/342,069 (17 pages)—dated Dec. 29, 2015.
Office action for co-pending U.S. Appl. No. 14/342,069 (22 pages)—dated Sep. 2, 2016.
Office action for co-pending U.S. Appl. No. 14/342,069 (21 pages)—dated Sep. 26, 2017.
Office action for co-pending U.S. Appl. No. 14/342,069 (21 pages)—dated Jun. 6, 2018.
Office action for co-pending U.S. Appl. No. 14/649,277 (9 pages)—dated Jul. 22, 2016.
Office action for co-pending U.S. Appl. No. 14/686,915 (8 pages)—dated Nov. 18, 2016.

(56) References Cited

OTHER PUBLICATIONS

Office action for co-pending U.S. Appl. No. 14/810,765 (7 pages)—dated Jan. 29, 2016.
Office action for co-pending U.S. Appl. No. 14/828,916 (8 pages)—dated Nov. 25, 2016.
Office action for co-pending U.S. Appl. No. 14/867,502 (9 pages)—dated Nov. 18, 2016.
Office action for co-pending U.S. Appl. No. 15/172,432 (16 pages)—dated Apr. 17, 2017.
Office action for co-pending U.S. Appl. No. 15/702,087 (5 pages)—dated Nov. 9, 2018.
Office action for co-pending U.S. Appl. No. 15/177,442 (17 pages)—dated May 19, 2017.
Office action for co-pending U.S. Appl. No. 15/378,159 (18 pages)—dated Mar. 2, 2017.
Office action for co-pending U.S. Appl. No. 15/222,122 (8 pages)—dated Nov. 20, 2017.
Office action for co-pending U.S. Appl. No. 15/310,837 (13 pages)—dated Jun. 21, 2018.
Office action for co-pending U.S. Appl. No. 15/411,972 (9 pages)—dated Mar. 28, 2017.
Office action for co-pending U.S. Appl. No. 15/411,972 (8 pages)—dated Nov. 29, 2017.
Office action for co-pending U.S. Appl. No. 15/411,972 (9 pages)—dated Jun. 14, 2018.
Office action for co-pending U.S. Appl. No. 15/116,254 (8 pages)—dated Apr. 26, 2018.
Office action for co-pending U.S. Appl. No. 15/116,254 (10 pages)—dated Aug. 15, 2018.
Office action for co-pending U.S. Appl. No. 15/333,670 (5 pages)—dated Dec. 8, 2017.
Office Action for co-pending U.S. Appl. No. 14/116,048 (10 pages)—dated Jun. 23, 2017.
Office action for co-pending U.S. Appl. No. 15/959,131 (8 pages)—dated Nov. 8, 2019.
Office action for co-pending U.S. Appl. No. 15/822,102 (6 pages)—dated Dec. 6, 2019.
Office action for co-pending U.S. Appl. No. 15/690,623 (6 pages)—dated Jan. 9, 2020.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D. 631,670 (68 pages, filed Jun. 19, 2015 by Petitioners Johns Manville Corporation and Johns Manville, Inc.).
2nd Petition for Inter Partes Review of U.S. Pat. No. D. 631,670 (62 pages, filed Nov. 2, 2015 by Petitioners Johns Manville Corporation and Johns Manville, Inc.).
Decision of PTAB regarding Institution of Inter Partes Review for U.S. Pat. No. D. 631,670 (33 pages)—Jan. 12, 2016.
Decision2 of PTAB regarding Institution of Inter Partes Review for U.S. Pat. No. D. 631,670 (27 pages)—May 9, 2016.
Final Written Decision of PTAB regarding Inter Partes Review of U.S. Pat. No. D. 631,670 based on 1st Petition (56 pages)—dated Jan. 11, 2017.
Final Written Decision of PTAB regarding Inter Partes Review of U.S. Pat. No. D. 631,670 based on 2nd Petition (55 pages)—datted May 8, 2017.
Court of Appeals for Federal Circuit Judgment from Appeal of PTAB Decisions in Inter Partes Reviews of U.S. Pat. No. D. 631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with $3^{rd}$ Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, dated Dec. 24, 2013, in Control No. 90/013,029, 11 pages.
Office Action Granting Ex Parte Reexamination of U.S. Pat. No. 7,772,347, dated Dec. 24, 2013, in Control No. 90/013,030, 14 pages.

(56) References Cited

OTHER PUBLICATIONS

Office Action Granting Ex Parte Reexamination of U.S. Pat. No. 7,854,980, dated Apr. 15, 2014, in Control No. 90/013,156, 20 pages.
Declaration of Jan Rud Andersen submitted in Ex parte Reexamination Control No. 90/013,030, as Document Oth-C, Oct. 10, 2013, 4 pages.
Final Rejection in Ex Parte Reexamination of U.S. Pat. No. 7,888,445 (20 pages)—dated Jul. 24, 2015.
Final Rejection in Ex Parte Reexamination of U.S. Pat. No. 7,772,347 (23 pages)—dated Jul. 24, 2015.
Final Rejection in Ex Parte Reexamination of U.S. Pat. No. 7,854,980 (31 pages)—dated Aug. 18, 2015.
Advisory Action in Ex Parte Reexamination of U.S. Pat. No. 7,888,445 (4 pages)—dated Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages)—dated Nov. 18, 2015.
Examer's Answer in Ex Parte Reexamination of U.S. Pat. No. 7,888,445 (8 pages)—dated Mar. 23, 2016.
Examiner's Answer in Ex Parte Reexamination of U.S. Pat. No. 7,772,347 (8 pages)—dated Mar. 23, 2016.
Examiner's Answer in Ex Parte Reexamination of U.S. Pat. No. 7,854,980 (8 pages)—dated Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of Ptab Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—dated Oct. 24, 2018.
Notice of Intent to Issue Ex Parte Reexamination Certificate for U.S. Pat. No. 7,888,445 (4 pages)—dated Dec. 7, 2018.
Notice of Intent to Issue Inter Partes Reexamination Certificate for U.S. Pat. No. 7,888,445 (14 pages)—dated Sep. 24, 2020.
Notice of Intent to Issue Inter Partes Reexamination Certificate for U.S. Pat. No. 7,772,347 (13 pages)—dated Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—dated Apr. 3, 2019.
Final Office Action from Reopened Prosecution in Ex Parte Reexamination of U.S. Pat. No. 7,854,980 (11 pages)—dated Aug. 8, 2019.
Notice of Intent to Issue Ex Parte Reexamination Certificate for U.S. Pat. No. 7,854,980 (3 pages)—dated Oct. 29, 2019.
Notice of Intent to Issue Inter Partes Reexamination Certificate for U.S. Pat. No. 7,807,771 (4 pages)—dated Jan. 30, 2014.
Notice of Intent to Issue Inter Partes Reexamination Certificate for U.S. Pat. No. 7,854,980 (6 pages)—dated Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—dated Oct. 17, 2016.
Examiner's Determination on Patent Owner Response/Requester Comments after Board Decision in Inter Partes Reexamination of U.S. Pat. No. 7,772,347 (17 pages)—dated Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—dated Sep. 8, 2017.
Final Decision of PTAB in Inter Partes Reexamination of U.S. Pat. No. 7,772,347 (24 pages)—dated Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of PTAB regarding Institution of Inter Partes Review for U.S. Pat. No. 8,114,210 (20 pages)—Oct. 21, 2015.
Final Written Decision of PTAB regarding Inter Partes Review of U.S. Pat. No. 8,114,210 (39 pages)—dated Oct. 19, 2016.
Court of Appeals for Federal Circuit Judgment from Appeal of PTAB Decision in Inter Partes Review of U.S. Pat. No. 8,114,210 (5 pages)—Jan. 16, 2018.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.
Statement of Revocation Grounds re GB2496951-Claimant Rockwool International (May 21, 2018, 22 pages).
Statement of Revocation Grounds re GB2451719-Claimant Rockwool International (May 18, 2018, 22 pages).
Expert Report re Revocation of GB2451719 and GB2496951-Claimant Rockwool International (Nov. 12, 2018, 11 pages).
United Kingdom Intellectual Property Office, Decision in Rockwool International v. Knauf Insulation Limited, Application under Section 72 for revocation of patents GB2451719 and GB2496951 (May 28, 2019—18 pages).

(56) References Cited

OTHER PUBLICATIONS

Decision of EPO Board of Appeal re Added Matter vis-à-vis EP06788492.4 (Jul. 17, 2019—14 pages).
U.S. Pat. No. 2,965,504—Part 1 (10 pages).
U.S. Pat. No. 2,965,504—Part 2 (14 pages).
U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).

* cited by examiner

BINDERS

CROSS-REFERENCE TO RELATED APPLICATIONS

This application is a continuation of U.S. application Ser. No. 15/310,837, filed Nov. 14, 2016, which is a U.S. national counterpart application of International Application Serial No. PCT/EP2015/060951, filed May 19, 2015, under 35 U.S.C. § 371, which claims priority to GB Application Serial No. 1408909.8, filed May 20, 2014, the disclosures of which are hereby incorporated herein by reference.

TECHNICAL FIELD

The present invention relates to a water-soluble carbohydrate-polyamino acid-based pre-reacted binder composition, a method of its manufacture, a use of the pre-reacted binder composition, a method of manufacturing a collection of matter bound by a polymeric binder resulting from the pre-reacted binder composition, a binder solution or dispersion comprising the pre-reacted binder composition, as well as products comprising the pre-reacted binder composition in a cured state.

BACKGROUND

Generally, binders are useful in fabricating articles because they are capable of consolidating non-assembled or loosely-assembled matter. For example, binders enable two or more surfaces to become united. In particular, binders may be used to produce products comprising consolidated fibres. Thermosetting binders may be characterized by being transformed into insoluble and infusible materials by means of either heat or catalytic action. Examples of a thermosetting binder include a variety of phenol-aldehyde, urea-aldehyde, and melamine-aldehyde binders, as well as other condensation-polymerization materials such as, for example, furane and polyurethane resins. Binder compositions containing phenol-aldehyde, resorcinol-aldehyde, phenol/aldehyde/urea, phenol/melamine/aldehyde, and the like are widely used for the bonding of fibres, textiles, plastics, rubbers, and many other materials.

The mineral wool and wood board industries have historically used a phenol formaldehyde-based binder, generally extended with urea. Phenol formaldehyde type binders provide suitable properties to the final products; however, desires for greater sustainability and environmental considerations have motivated the development of alternative binders. One such alternative binder is a carbohydrate-based binder derived from reacting a carbohydrate and an acid, for example, U.S Patent Application Publication No. 2007/0027283 and published PCT Application WO2009/019235. Another alternative binder is the esterification products of reacting a polycarboxylic acid and a polyol, for example, U.S. Patent Application Publication No. 2005/0202224. Because these binders do not utilize formaldehyde as a reagent, they have been collectively referred to as formaldehyde-free binders.

One area of current development is to find a replacement for the phenol-formaldehyde type binders across a large range of products, including products in the building and automotive sector (e.g., mineral wool insulation, wood boards, particle boards, plywood, office panels, and acoustical sound insulation). Previously developed formaldehyde-free binders may not possess all of the desired properties. For example, acrylic acid-based and poly(vinylalcohol)-based binders have shown promising performance characteristics for some, but not all, products. However, the aforementioned binders are relatively more expensive than phenol-formaldehyde binders, are derived essentially from petroleum-based resources, and have a tendency to exhibit lower reaction rates compared to phenol-formaldehyde-based binder compositions, thereby requiring prolonged cure times or increased cure temperatures.

Carbohydrate-based binder compositions are made of relatively inexpensive precursors and are derived mainly from renewable resources. These binders may also require reaction conditions for curing that are substantially different from the conditions under which the traditional phenol-formaldehyde binder system is cured. However, a versatile alternative to the above-mentioned phenol-formaldehyde binders is the use of carbohydrate-polyamine binders, which are polymeric binders obtained upon reaction of carbohydrates with polyamines having at least one primary amine group. Carbohydrate-polyamine binders are effective substitutes for phenol-formaldehyde binders, since they possess similar or superior binding characteristics and are highly compatible with established manufacturing processes.

Typically, carbohydrate-polyamine binders are prepared as a solution, such as an aqueous solution, and are subsequently applied onto loosely-assembled matter that is to be bound. Such wetted loosely-assembled matter is then, for example, heat treated to cure the carbohydrate-polyamine binder. The rather high concentration of solids in carbohydrate-polyamine binder solutions is associated with a variety of disadvantages, however, such as quick gelling or solidification of the binder solution, as well as recrystallization of the carbohydrate component(s). Based on the rather short shelf-life, further problems regarding storage and shipment of carbohydrate-polyamine binders are often observed.

OBJECT OF THE INVENTION

Accordingly, the technical problem underlying the present invention is to provide improved binders, particularly binders which are i) compatible with established manufacturing processes, ii) environmentally acceptable, and iii) overcome the aforementioned problems.

SUMMARY

In order to solve the above technical problem, as a first aspect, the present invention provides a water-soluble pre-reacted binder composition, comprising the reaction product(s) of (i) at least one carbohydrate component, and (ii) at least one polyamino acid component.

The pre-reacted binder may be in the form of an aqueous solution or dispersion containing at least 20 wt.-%, for example at least 25% wt.-, 30% wt.-, 35% wt-, 40% wt.-, 45 wt.-%, 50 wt.-%, 55 wt.-%, 60 wt.-%, 65 wt.-%, 70 wt.-%, 75 wt.-% or 80 wt.-% of the pre-reacted binder composition and/or no more than 85 wt.-%, for example no more than 80 wt.-%, 75 wt.-% or 70 wt.-% of the pre-reacted binder composition.

DETAILED DESCRIPTION

Figure 1:
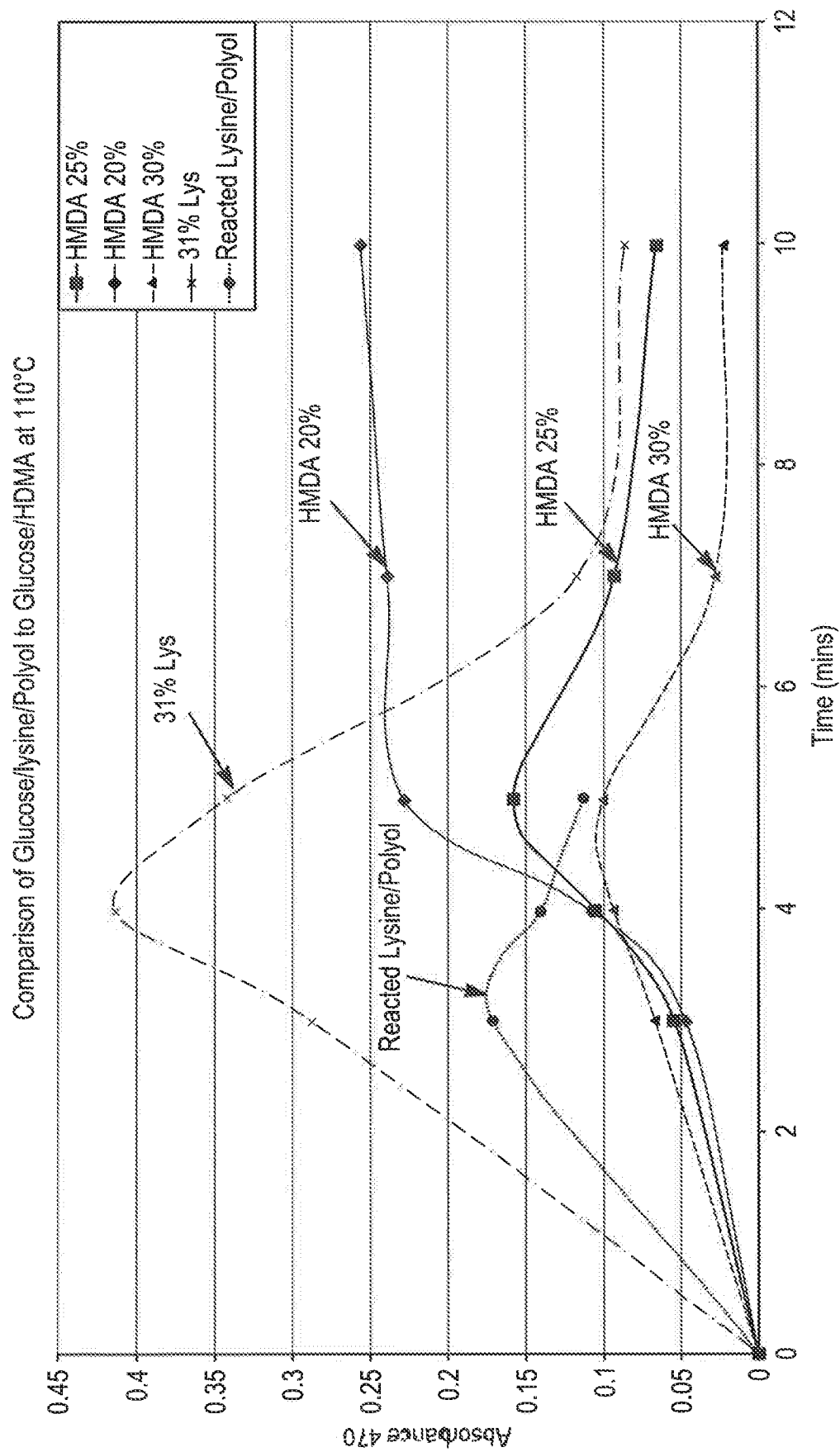
FIG. 1 shows: Cure rates of Glucose/Lysine/Polyol formulations vs. Glucose/HMDA binder formulations at 110° C.

According to the present invention, the term "pre-reacted binder composition" is not particularly restricted and generally includes any chemical composition obtainable and/or obtained by reacting a carbohydrate component and a polyamino acid component, which composition may be used as a binder, e.g., for binding loosely-assembled matter, either as such or upon further modification.

Preferred embodiments of the pre-reacted binder composition of the present invention are based on an alkaline carbohydrate component/polyamino acid component binder system, i.e., the carbohydrate component(s) and polyamino acid component(s) are the major reactive components of the starting material(s). Accordingly, the total amount of the at least one carbohydrate component and the at least one polyamino acid component in the starting material used to prepare the pre-reacted binder composition may be at least 20 wt.-%, based on the total weight of the binder composition before pre-reaction. For example, the total amount of the at least one carbohydrate component and the at least one polyamino acid component may be at least 30 wt.-%, 40 wt.-%, 50 wt.-%, 60 wt.-%, 70 wt.-%, 80 wt.-%, 90 wt.-%, 95 wt.-%, or 98 wt.-% before pre-reaction.

According to one embodiment of the present invention, the total amount of the reaction product(s) of (i) the at least one carbohydrate component, (ii) the at least one polyamino acid component, the unreacted carbohydrate component(s), and the unreacted polyamino acid component(s) in the pre-reacted binder composition (i.e., the amount of reaction product(s) of (i) and (ii)+amount of unreacted carbohydrate component(s)+amount of unreacted polyamino acid component(s)) is at least 20 wt.-%, based on the total weight of the pre-reacted binder composition, for example at least 30 wt.-%, 40 wt.-%, 50 wt.-%, 60 wt.-%, 70 wt.-%, 80 wt.-%. 90 wt.-%, 95 wt.-%, or 98 wt.-%.

Compared with the state of the art where carbohydrate and polyamine reactants are dissolved to form a binder, which is applied to loosely-assembled matter and subsequently cross-linked by application of heat to yield a polymeric binder, the pre-reacted binder composition of the present invention is a composition that:

a) compared with such prior art binders as applied to loosely-assembled matter (notably prior to cross-linking by application of heat), may have intermediate reaction specie(s) such as pre-polymers, in significant quantities, and/or reduced viscosity per solid content, and/or increased average molecular weight, and/or increased colour and/or light (e.g., UV) absorption; and/or b) compared with such prior art binders, once partially or fully cross-linked (notably subsequent to application of heat) may have a significantly lower degree and/or or a different kind of cross-linkage and/or lower viscosity.

As used herein, the term "pre-polymer" is not specifically restricted and includes any reaction product(s) of (i) the at least one carbohydrate component and (ii) the at least one polyamino acid component.

According to one embodiment of the present invention, the amount of the reaction product(s) of (i) the at least one carbohydrate component and (ii) the at least one polyamino acid component is at least 20 wt.-%, based on the total weight of pre-polymers in the pre-reacted binder composition, for example at least 30 wt.-%, 40 wt.-%, 50 wt.-%, 60 wt.-%, 70 wt.-%, 80 wt.-%, 90 wt.-%, 95 wt.-%, or 98 wt.-%. According to a specific embodiment, the amount of the reaction product(s) of (i) the at least one carbohydrate component and (ii) the at least one polyamino acid component is 100 wt.-%, based on the total weight of pre-polymers in the pre-reacted binder composition.

According to one embodiment, the pre-reacted binder composition of the present invention comprises at least one pre-polymer having a molecular weight in the range of 1 to 100 kDa. Preferably, the at least one pre-polymer is contained, based on the total weight of the binder composition, in an amount of 2 wt.-% or more, e.g., 5 wt.-% or more, 10 wt.-% or more, 15 wt.-% or more, 20 wt.-% or more, 25 wt.-% or more, 30 wt.-% or more, 35 wt.-% or more, 40 wt.-% or more, 45 wt.-% or more, or 50 wt.-% or more.

According to a further embodiment, the pre-reacted binder composition of the present invention comprises at least one pre-polymer having a molecular weight in the range of more than 80 kDa to 100 kDa (hereinafter "high molecular-weight pre-polymer"). Preferably, the at least one high molecular-weight pre-polymer is contained, based on the total weight of the binder composition, in an amount of 0.2 wt.-% or more, e.g., 0.5 wt.-% or more, 0.75 wt.-% or more, 1 wt.-% or more, 1.75 wt.-% or more, 2.5 wt.-% or more, 5 wt.-% or more, 10 wt.-% or more, 15 wt.-% or more, 20 wt.-% or more, 30 wt.-% or more, 40 wt.-% or more, or 50 wt.-% or more.

According to a further embodiment, the pre-reacted binder composition of the present invention comprises at least one pre-polymer having a molecular weight in the range of more than 10 kDa to 80 kDa (hereinafter "mid molecular-weight pre-polymer"). Preferably, the at least one mid molecular-weight pre-polymer is contained, based on the total weight of the binder composition, in an amount of 0.3 wt.-% or more, e.g., 0.5 wt.-% or more, 1 wt.-% or more, 1.5 wt.-% or more, 2 wt.-% or more, 2.5 wt.-% or more, 5 wt.-% or more, 10 wt.-% or more, 15 wt.-% or more, 20 wt.-% or more, 30 wt.-% or more, 40 wt.-% or more, or 50 wt.-% or more.

According to a further embodiment, the pre-reacted binder composition of the present invention comprises one or more compounds having a molecular weight in the range of 10 kDa or less, which may include pre-polymer referred to herein as low molecular-weight pre-polymer, and which are different from (i) the at least one carbohydrate component and (ii) the at least one polyamino acid component. According to a specific embodiment, the low molecular-weight compounds comprise one or more of a glycolaldehyde, glyceraldehyde, 2-oxopropanal, acetol, dihydroxyacetone, acetoin, butanedione, ethanal, glucosone, 1-desoxyhexosulose, 3-desoxyhexosulose, 3-desoxypentosulose, 1,4-didesoxyhexosulose, glyoxal, methylglyoxal, diacetyl and 5-(hydroxymethyl)furfural.

As used herein, the term "water-soluble" is not specifically restricted and includes all grades of water-solubility of the pre-reacted binder composition as defined above. In particular, the term "water-soluble" includes water-solubility at 20° C. of 100 g/l or more, 150 g/l or more, 200 g/l or more, or 250 g/l or more. For example, the term "water-soluble" may include a water-solubility for the pre-reacted binder composition as defined above of 300 g/l or more, 400 g/l or more, 500 g/l or more or 600 g/l or more (at 20° C.). Also virtually infinite water-solubility may be regarded to be within the scope of the present invention.

As used herein, the expression "water-insoluble" according to the present invention relates to cases where the pre-reacted binder composition as defined above is essentially insoluble in water at 20° C. For example, the term insoluble includes a water-solubility at 20° C. of 50 g/l or less, 40 g/l or less, 30 g/l or less, or 20 g/l or less. Preferably, the term water-insoluble includes cases of water-solubility of 10 g/l or less, 5 g/l or less, 1 g/l or less or 0.1 g/l or less.

The pre-reacted binder composition may be water dilutable, where this means that 1 part by weight of pre-reacted binder composition as defined above mixed with at least 25 parts, notably at least 50 parts or 100 parts, of deionized water does not result in precipitation upon mixing.

According to a preferred embodiment of the present invention, an aqueous solution containing 70 wt.-% of the pre-reacted binder composition of the present invention has a viscosity at 20° C. of at most 2000 cP. For example, an aqueous solution containing 70 wt.-% of the above-defined pre-reacted binder composition (i.e., an aqueous solution containing 70% wt.-% of solids) may have an initial viscosity after its preparation of 100 cP to 1500 cP, 150 cP to 1200 cP, 200 cP to 800 cP, 220 cP to 600 cP, or 250 cP to 400 cP. From the viewpoint of handling, a preferred viscosity is in the range of 280 cP to 350 cP, where viscosity may be measured using a LV-Torque Brookfield Viscometer, spindle LV-63 at 60 rpm. For fibres, however, the viscosity would be much lower (<30 cP) due to the lower solids content, and measured using a Brookfield DV-II+Pro at 20° C., Spindle SC4-18.

Moreover, the viscosity of an aqueous solution of the pre-reacted binder composition of the present invention should preferably not increase by more than 500 cP when left to stand at 20° C. for 12 hours, 24 hours, 48 hours, 72 hours or 96 hours. According to a further preferred embodiment, the viscosity of the aqueous solution should not increase by more than 500 cP within a week, 10 days, 12 days or two weeks. Longer periods, such as three or four weeks, or even two, three or more months, where the viscosity will not increase by more than 500 cP are even more preferable.

According to a further embodiment of the present invention, the amount by which the viscosity increases within the first 12 hours when leaving a 70 wt.-% aqueous solution of the pre-reacted binder composition to stand at 20° C. should preferably not exceed 450 cP, or 400 cP or even 350 CP. Preferred increases in viscosity include increases of 300 cP or less, 280 cP or less, 250 cP or less and 200 cP or less.

According to the present invention, the above-defined time periods and increases in viscosity are not limited to the examples mentioned above and may be freely combined. For example, preferably, the above-mentioned 70 wt.-% aqueous solution of the pre-reacted binder composition does not increase in viscosity by more than 300 cP within the first 48 hours after its preparation, or more than 400 cP within two weeks after its preparation. Generally, if the viscosity of a representative aqueous solution becomes too high, e.g., caused by gelling, the pre-reacted binder composition may become unusable.

According to a further embodiment of the present invention, the above-defined pre-reacted binder composition is capable of reacting and/or reacts with a cross-linker to yield a water-insoluble composition, for example, to yield one or more melanoidins as a water-insoluble composition. In the present invention, the pre-reacted binder composition may function as a precursor or intermediate which may be further reacted with a cross-linker to obtain a polymeric binder. For example, this polymeric binder may contain high molecular weight melanoidins as Maillard reaction products that are essentially water-insoluble.

For example, the one or more melanoidins as defined above may contain the following generic structural motifs:

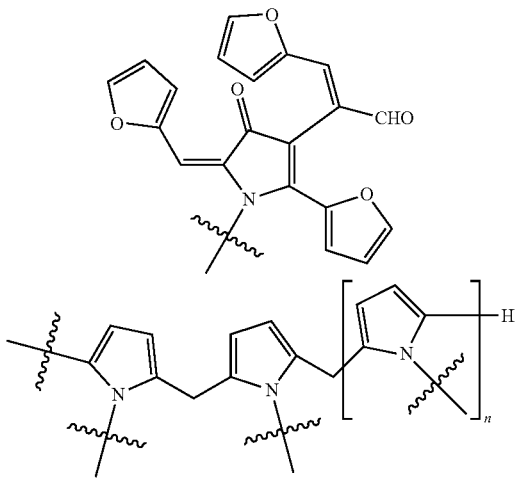

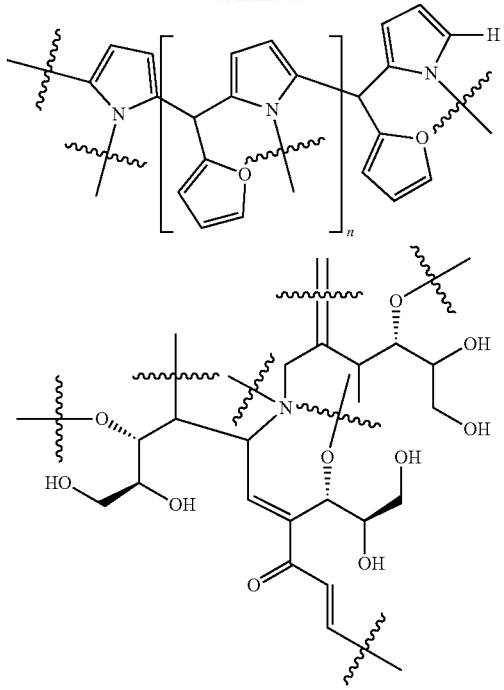

wherein n is an integer of at least 1.

As used herein, the term "cross-linker" is not particularly restricted and includes any chemical or physical means to further cross-link the pre-reacted binder composition as defined above to yield a polymeric binder suitable for binding loosely-assembled matter, such as wood or mineral fibres.

According to a specific embodiment of the present invention, the cross-linker may be the same polyamino acid component that has been reacted with the carbohydrate component, or the cross-linker may be a different polyamino acid component(s). For example, the pre-reacted binder composition of the present invention may be prepared by reacting a carbohydrate component with lysine. Subsequently, further lysine may be added to the pre-reacted binder composition to achieve the high grade of polymerization required for a particular application. A further example includes the case where the pre-reacted binder composition of the present invention is prepared by reacting a carbohydrate component with lysine, and for the final curing additional polyamino acid is added in the form of diaminopropionic acid, diaminobutyric acid, ornithine, histidine, arginine, and/or homolysine.

According to the present invention, however, the cross-linker is not limited to the polyamino acid components defined herein and includes, as an example, Lewis acids, isocyanates, blocked isocyanates, epoxides, blocked epoxides, carbonyl-containing compounds (e.g., ketones and aldehydes), polyamines, and organic carbonates. Specific non-limiting examples of such cross-linkers include glyoxal, citric acid, other polycarboxylic acids and anhydrides (e.g., succinic acid, maleic anhydride, tetra- and hexa-hydrophthalic anhydrides, styrene-maleic-anhydride copolymers), hexamethylene diamine (as well as shorter and longer homologs thereof), and solutions of polycarboxylic acid and anhydride derivatives (e.g., ammonium salts thereof).

According to a further embodiment of the above-defined pre-reacted binder composition, the ratio of the total carbonyl groups in the carbohydrate component to total reactive amino groups in the polyamino acid component ranges from 5:1 to 1:5. For example, the ratio of carbonyl groups to reactive amino groups may be 5:1 to 1:4.5, 5:1 to 1:4, 5:1 to 1:3.5, 5:1 to 1:3, 5:1 to 1:2.5, 5:1 to 1:2, 5:1 to 1:1.8. 5:1 to 1:1.5, 5:1 to 1:1.2, 5:1 to 1:1, 5:1 to 1:0.8, and 5:1 to 1:0.5. Further examples include ratios such as 4:1 to 1:5, 3.5:1 to 1:5, 3:1 to 1:5, 2.5:1 to 1:5, 2:1 to 1:5, 1.5:1 to 1:5, 1:1 to 1:5, 0.8:1 to 1:5 and 0.5:1 to 1:5. According to the present invention, the upper and lower borders of the above-mentioned ratios may be freely combined.

As used herein, the term "reactive amino group" is not particularly restricted and includes any amino group in the polyamino acid component which is capable of reacting with the carbohydrate component. Examples of such reactive amino groups include primary and secondary amino groups, imine (or imino) groups, as well as guanido (or guanidino) groups.

As used herein, the term "carbohydrate component" is not specifically restricted and generally includes any carbohydrate compound which is capable of reacting with a polyamino acid component.

According to one embodiment of the above-defined pre-reacted binder, the at least one carbohydrate component is selected from the group consisting of monosaccharides, disaccharides, polysaccharides, and a reaction product thereof.

Preferably, the carbohydrate component is or comprises a reducing sugar and/or a component which yields a reducing sugar in situ. As used herein, the term "reducing sugar" indicates one or more sugars that contain aldehyde or keto groups, or that can isomerize, i.e., tautomerize, to contain aldehyde or keto groups, which groups may be oxidized with, for example, Cu-ions to afford carboxylic acids. According to the present invention, any such carbohydrate component may be optionally substituted, such as with hydroxy, halo, alkyl, cycloalkyl, heteroalkyl, cycloheteroalkyl, alkoxy, and the like. In any such carbohydrate component, one or more chiral centers may be present, and both possible optical isomers at each chiral center are within the scope of the invention described herein. Further, it is also to be understood that various mixtures, including racemic mixtures, or other diastereomeric mixtures of the various optical isomers of any such carbohydrate component, as well as various geometric isomers thereof, may be used in one or more embodiments described herein.

Non-reducing sugars, for instance sucrose, may be used as the carbohydrate component or as a part thereof, especially when capable of and/or subjected to in situ conversion to a reducing sugar. Further, it is also understood that a monosaccharide, a disaccharide, or a polysaccharide may be partially reacted with a precursor to form a carbohydrate reaction product. To the extent that the carbohydrate reaction product is derived from a monosaccharide, a disaccharide, or a polysaccharide, and maintains similar reactivity with a polyamino acid component to form reaction products similar to those of a monosaccharide, a disaccharide, or a polysaccharide with a polyamino acid component, the carbohydrate reaction product is within the scope of term "carbohydrate component" as used herein.

Preferably, any carbohydrate component should be sufficiently nonvolatile to maximize its ability to remain available for reaction with the polyamino acid component. The carbohydrate component may be a monosaccharide in its aldose or ketose form, including a triose, a tetrose, a pentose, a hexose, or a heptose; or a polysaccharide; or combinations thereof. For example, when a triose serves as the carbohydrate component, or is used in combination with other reducing sugars and/or a polysaccharide, an aldotriose sugar or a ketotriose sugar may be utilized, such as glyceraldehyde and dihydroxyacetone, respectively. When a tetrose serves as the carbohydrate component, or is used in combination with other reducing sugars and/or a polysaccharide, aldotetrose sugars, such as erythrose and threose may be utilized; and ketotetrose sugars, such as erythrulose, may be utilized. When a pentose serves as the carbohydrate component, or is used in combination with other reducing sugars and/or a polysaccharide, aldopentose sugars, such as ribose, arabinose, xylose, and lyxose may be utilized; and ketopentose sugars, such as ribulose, arabulose, xylulose, and lyxulose, may be utilized. When a hexose serves as the carbohydrate component, or is used in combination with other reducing sugars and/or a polysaccharide, aldohexose sugars, such as glucose (i.e., dextrose), mannose, galactose, allose, altrose, talose, gulose, and idose may be utilized; and ketohexose sugars, such as fructose, psicose, sorbose and tagatose, may be utilized. When a heptose serves as the carbohydrate component, or is used in combination with other reducing sugars and/or a polysaccharide, a ketoheptose sugar such as sedoheptulose may be utilized. Other stereoisomers of such carbohydrate components not known to occur naturally are also contemplated to be useful in preparing the binder compositions as described herein. In one embodiment, the carbohydrate component is high fructose corn syrup (HFCS).

As mentioned above, the carbohydrate component may be a polysaccharide. For example, the carbohydrate component may be a polysaccharide with a low degree of polymerization, including, for example, molasses, starch, cellulose hydrolysates, or mixtures thereof. According to a specific example, the carbohydrate component is a starch hydrolysate, a maltodextrin, or a mixture thereof. While carbohydrates of higher degrees of polymerization may not be preferable, they may nonetheless be useful within the scope of the present invention when they are treated to achieve in situ depolymerization.

Furthermore, according to the present invention, the carbohydrate component may be used in combination with a non-carbohydrate polyhydroxy reactant. Examples of non-carbohydrate polyhydroxy reactants which can be used in combination with the carbohydrate component include, but are not limited to, trimethylolpropane, glycerol, triethanolamine, pentaerythritol, polyvinyl alcohol, partially hydrolyzed polyvinyl acetate, fully hydrolyzed polyvinyl acetate, and mixtures thereof. For example, a non-carbohydrate polyhydroxy reactant is sufficiently nonvolatile to maximize its ability to remain available for reaction with a polyamino acid and/or with a monomeric or polymeric cross-linker. Moreover, according to the present invention, the hydrophobicity of the non-carbohydrate polyhydroxy reactant may be a factor in determining the physical properties of a binder prepared as described herein. Other co-reacting compounds, for example, carbonyl-containing compounds—aldehydes, ketones, carboxylic acids and anhydrides, and the like, may be used.

In a preferred embodiment of the above-defined pre-reacted binder composition, the at least one carbohydrate component is selected from the group consisting of ribose, arabinose, xylose, lyxose, glucose (i.e., dextrose), mannose, galactose, allose, altrose, talose, gulose, idose, fructose, psicose, sorbose, dihydroxyacetone, sucrose and tagatose, as well as mixtures thereof.

As used herein, the expression "polyamino acid component" is not particularly limited and includes any amino acid, either alone or in a mixture of amino acids (e.g., from hydrolyzed protein and/or amino acid-containing waste sludge), which contains at least two amino groups that are capable of reacting and/or react with the at least one carbohydrate component. According to the present invention, any such polyamino acid component may be optionally substituted, such as with hydroxy, halo, alkyl, cycloalkyl, heteroalkyl, cycloheteroalkyl, alkoxy, and the like.

According to one embodiment of the present invention, in the pre-reacted binder composition as defined above, the at least one polyamino acid component is lysine, which may be substituted or unsubstituted, as well as salts thereof. For example, as the polyamino acid component, lysine may be used as such (e.g., in the form of an aqueous solution), or lysine may be used in the form of an inorganic or organic salt, as long as these salts do not interfere with reaction between lysine and the carbohydrate component defined above. Specific, non-limiting, examples of inorganic salts include chloride, sulfate, phosphate, and nitrate salts. Specific, non-limiting, examples of organic salts include citrate, succinate, and tartrate salts.

As described above, according to one embodiment of the present invention, the polyamino acid component in the pre-reacted binder composition may be a polyamino acid such as lysine, which may be described as α,ε-diaminohexanoic acid or, more generally, as an α,ω-diaminoalkyl carboxylic acid. Also contemplated for use according to the present invention are other α,ω-diaminoalkyl carboxylic acids, which may be substituted or unsubstituted, including but not limited to α,β-diaminopropionic acid, α,γ-diaminobutyric acid, α,δ-diaminopentanoic acid (i.e., ornithine), and α,ζ-diaminoheptanoic acid (i.e., homolysine).

Alternatively, the polyamino acid component according to the present invention may be a polyamino acid such as β,β'-diaminoisobutyric acid, which may be substituted or unsubstituted. Likewise, the polyamino acid component according to the present invention may be a polyamino acid such as γ,γ'-diaminoisohexanoic acid, δ,δ'-diaminosiooctanoic acid, and like polyamino acids, which may be substituted or unsubstituted. Further, the polyamino acid component according to the present invention may be a polyamino acid such as β,γ-diaminopentanoic acid, β,δ-diaminopentanoic acid, γ,δ-diaminopentanoic acid, β,γ-diaminohexanoic acid, β, δ-diaminohexanoic acid, β,ε-diaminohexanoic acid, γ,δ-diaminohexanoic acid, γ,ε-diaminohexanoic acid, δ,ε-diaminohexanoic acid, β,ε-diaminoheptanoic acid, and like polyamino acids, which may be substituted or unsubstituted.

A further embodiment of a pre-reacted binder composition exemplifies in situ generation of a polyamino acid as an alternative to its overt use in a binder composition. Asparagine and glutamine, which are monoamino acids each possessing an alpha amino group and a side-chain carboxamide group, are both expected to react with a carbohydrate component, as described herein. Following such a reaction, reaction conditions may be adjusted to promote the Hoffmann degradation of primary amides, which reaction conditions include a basic pH, NaOH, and bromine. Hoffmann degradation conditions are known to convert the side-chain carboxamide group of asparagine and glutamine into an amino group through an intermediate isocyanate (i.e., R—N=C=O) thereby resulting in α,β-diaminopropionic acid and α,γ-diaminobutyric acid, respectively. The resulting diaminopropionic acid β-amino group and diaminobutyric acid γ-amino group would be expected to react with a carbohydrate component, as described herein. The aforementioned intermediate isocyanate would also be expected to react with dextrose in non-Maillard chemistry. As a result of both types of chemistry occurring simultaneously, to varying extents, extensive cross-linking would be expected to occur with concomitant binder formation. Alternatives to the Hoffmann degradation conditions, each of which will carry out the conversion of a primary amide (e.g., the side chain of asparagine and/or glutamine) to a primary amine, include N-bromosuccinimide/diazabicycloundecene, phenyl-iodosyl-bis[trifluoroacetate], and Iodobenzene diacetate.

While the polyamino amino acids histidine and arginine may not be preferable, they may nonetheless also be useful and are within the scope of the present invention. Herein, the term "polyamino acid" includes any amino acid having two or more amino groups, which are capable of reacting and/or react with the at least one carbohydrate component.

According to the present invention, a polyamine may be used as a cross-linker to further cross-link the pre-reacted binder composition as defined above to yield a polymeric binder suitable for binding loosely-assembled matter, such as wood or mineral fibres. As used herein, the term "polyamine" includes polyamino acids as well as other organic compounds having two or more amino groups, which may independently be substituted. Thus, a polyamine that is a polyamino acid (e.g., lysine) may be used to prepare/cross-link a polymeric binder as described herein, and a polyamine (e.g., hexamethylenediamine) may be used in combination with a polyamino acid (e.g., lysine) to prepare/cross-link a polymeric binder as described herein. As used herein, a "primary polyamine" is an organic compound having two or more primary amino groups ($-NH_2$). Within the scope of the term primary polyamine are those compounds which can be modified in situ or isomerize to generate a compound having two or more primary amino groups ($-NH_2$).

For example, a polyamine, when used as a cross-linker, may be a primary polyamine. According to one embodiment of the present invention, the primary polyamine may be a molecule having the formula $H_2N-Q-NH_2$, wherein Q is an alkyl, cycloalkyl, heteroalkyl, or cycloheteroalkyl, each of which may be optionally substituted. For example, Q may be an alkyl group selected from a group consisting of $C_2-C_{24}$, an alkyl selected from a group consisting of $C_2-C_9$, and an alkyl selected from a group consisting of $C_3-C_7$. According to a preferred embodiment, Q is a $C_6$ alkyl. According to another embodiment, Q may be a cyclohexyl, cyclopentyl or cyclobutyl, or a benzyl group.

As used herein, the term "alkyl" includes a chain of carbon atoms, which may optionally be branched. As used herein, the terms "alkenyl" and "alkynyl" independently include a chain of carbon atoms, which may optionally be branched, and include at least one double bond or triple bond, respectively. It is to be understood that alkynyl may also include one or more double bonds. It is to be further understood that alkyl is advantageously of limited length, including $C_1-C_{24}$, $C_1-C_{12}$, $C_1-C_6$, $C_1-C_6$, and $C_1-C_4$. It is to be further understood that alkenyl and/or alkynyl may each be advantageously of limited length, including $C_2-C_{24}$, $C_2-C_{12}$, $C_2-C_8$, $C_2-C_6$, and $C_2-C_4$. In particular, shorter alkyl, alkenyl, and/or alkynyl groups may add less hydrophilicity to the compound and accordingly will have different reactivity towards the carbohydrate component and solubility in a binder solution.

As used herein, the term "cycloalkyl" includes a chain of carbon atoms, which may optionally be branched, where at least a portion of the chain is cyclic. Moreover, according to the present invention it is to be noted that the term "cycloalkylalkyl" is regarded as a subset of cycloalkyl, and that the term "cycloalkyl" also includes polycyclic structures. For example, such cycloalkyls include, but are not limited to, cyclopropyl, cyclopentyl, cyclohexyl, 2-methylcyclopropyl, cyclopentyleth-2-yl, adamantyl, and the like. As used herein, the term "cycloalkenyl" includes a chain of carbon atoms, which may optionally be branched, and includes at least one double bond, where at least a portion of the chain is cyclic. According to the present invention, said at least one double bond may be in the cyclic portion of cycloalkenyl and/or the non-cyclic portion of cycloalkenyl. Moreover, it is to be understood that cycloalkenylalkyl and cycloalkylalkenyl are each regarded as subsets of cycloalkenyl. Moreover, according to the present invention "cycloalkyl" may be polycyclic. Examples of such cycloalkenyls include, but are not limited to, cyclopentenyl, cyclohexylethen-2-yl, cycloheptenylpropenyl, and the like. Furthermore, the chain forming cycloalkyl and/or cycloalkenyl is advantageously of limited length, including $C_3-C_{24}$, $C_3-C_{12}$, $C_3-C_8$, $C_3-C_6$, and $C_5-C_6$. According to the present invention, shorter alkyl and/or alkenyl chains forming cycloalkyl and/or cycloalkenyl, respectively, may add less lipophilicity to the compound and accordingly will have different behavior.

As used herein, the term "heteroalkyl" includes a chain of atoms that includes both carbon and at least one heteroatom, and is optionally branched. Examples of such heteroatoms include nitrogen, oxygen, and sulfur. In certain variations, said hetero-atoms also include phosphorus, and selenium. In one embodiment, a heteroalkyl is a polyether. As used herein, the term "cycloheteroalkyl" including heterocyclyl and heterocycle, includes a chain of atoms that includes both carbon and at least one heteroatom, such as heteroalkyl, and may optionally be branched, where at least a portion of the chain is cyclic. Similarly, examples of cycloheteroalkyl include, but are not limited to, tetrahydrofuryl, pyrrolidinyl, tetrahydropyranyl, piperidinyl, morpholinyl, piperazinyl, homopiperazinyl, quinuclidinyl, and the like.

Herein, the term "optionally substituted" includes the replacement of hydrogen atoms with other functional groups on the radical that is optionally substituted. Such other functional groups illustratively include, but are not limited to, amino, hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof, and the like. Illustratively, any of amino, hydroxyl, thiol, alkyl, haloalkyl, heteroalkyl, aryl, arylalkyl, arylheteroalkyl, and/or sulfonic acid is optionally substituted.

Illustratively, a primary polyamine used as a cross-linker to further cross-link the pre-reacted binder composition (resulting from reaction between a carbohydrate component and a polyamino acid component as described herein) may be a diamine, triamine, tetraamine, or pentamine. According to one embodiment, the polyamine is a triamine selected from a diethylenetriamine, 1-piperazineethaneamine, or bis(hexamethylene)triamine. In another embodiment, the polyamine is a tetramine, for example triethylenetetramine. In another embodiment, the polyamine is a pentamine, for example tetraethylenepentamine.

One aspect of the primary polyamine is that it may possess low steric hindrance. For example, 1,2-diaminoethane, 1,4-diaminobutane, 1,5-diaminopentane, 1,6-diaminohexane, 1,12-diaminododecane, 1,4-diaminocyclohexane, 1,4-diaminoben-zene, diethylenetriamine, triethylenetetramine, tetraethylenepentamine, 1-piperazine-ethaneamine, 2-methyl-pentamethylenediamine, 1,3-pentanediamine, and bis(hexamethylene)triamine, as well as 1,8-diaminooctane have low steric hindrance and are within the scope of the present invention as are other polyamines (e.g. polyethylene imines, polyvinylamines, polyetheramines). According to a preferred embodiment of the present invention, the polyamino acid lysine is combined with 1,6-diaminohexane (hexamethylenediamine, HMDA) and/or triethanolamine and/or glycerol to form a pre-reacted binder composition as defined above.

As used herein, the term "solvent" is not particularly restricted and includes any solvent which may be used to carry out a reaction between the carbohydrate component and the polyamino acid component. For example, the solvent may be water, an organic solvent or mixtures thereof. Examples of organic solvents include alcohols, ethers, esters, ketones, aldehydes, alkanes and cycloalkanes. Preferably, the solvent consists of or consists essentially of water.

According to a further embodiment of the present invention, the above-defined pre-reacted binder composition has an average molecular weight in the range of 200 Daltons to 5000 Daltons. According to the present invention, the average molecular weight of the pre-reacted binder composition may range from 300 Daltons to 4500 Daltons, from 400 Daltons to 4000 Daltons, from 450 Daltons to 3500 Daltons, from 500 Daltons to 300 Daltons or from 600 Daltons to 1500 Daltons. However, the average molecular weight of the pre-reacted binder composition is not limited to the aforementioned ranges and the upper and lower values thereof may be freely combined.

A further embodiment of the present invention relates to the above-defined pre-reacted binder composition, wherein the weight ratio between the carbohydrate component and the polyamino acid component is 0.5:1 to 30:1. Examples of further inclusive molar ratios include ratios of 0.7:1 to 25:1, 1:1 to 22:1, 1.5:1 to 20:1, 2:1 to 15:1, 2.5:1 to 10:1 or 3:1 to 8:1. However, according to the present invention, the molar ratio of carbohydrate component to polyamino acid component is not limited to the aforementioned ranges and the above upper and lower borders may be freely combined.

A further embodiment of the present invention relates to the pre-reacted binder composition as defined above comprising at least 10% of the initial carbonyl groups provided by the carbohydrate component. In particular, in some embodiments of the pre-reacted binder composition of the present invention some of the initial carbonyl groups of the carbohydrate component have not reacted with the polyamino acid component and are still present therein. Further examples of the number of unreacted carbonyl groups in the pre-reacted binder composition include at least 15%, at least 20%, at least 25%, at least 30%, at least 35%, at least 40%, at least 50%, at least 60% or at least 75% of the carbonyl groups present in the carbohydrate component before reaction with the polyamino acid component. According to a specific embodiment, the initial carbonyl groups are present in the form of unreacted carbohydrate.

As used herein, the expression "unreacted carbohydrate" component relates to any compound of the (i) at least one carbohydrate component which is still present in its initial form, i.e., which has not undergone any reaction. According to one embodiment, the pre-reacted binder composition comprises, based on the total weight of the binder composition, up to 80 wt.-% of unreacted carbohydrate, e.g., up to 75 wt.-%, up to 70 wt.-%, up to 65 wt.-%, up to 60 wt.-%, up to 55 wt.-% or up to 50 wt.-%.

Depending on its chemical composition, the pre-reacted binder composition of the present invention may be used as such, i.e., by applying it to loosely-assembled matter and curing it, for example through application of heat and/or radiation to arrive at a polymeric binder.

In a further embodiment, the pre-reacted binder composition may be used by subsequently adding a cross-linker, applying the mixture onto the loosely-assembled matter and curing the mixture, thus forming a highly cross-linked polymeric binder having similar or even improved properties over known carbohydrate-based binders. In this case, the pre-reacted binder composition of the present application may advantageously be prepared, stored and/or shipped, and used later and/or at a different location by adding a cross-linker, to complete the final binder composition.

If not stated otherwise, any of the above definitions also apply to the further aspects and embodiments of the present invention described below.

A further aspect of the present invention relates to a method of manufacturing the pre-reacted binder composition as defined above, comprising the steps:
(i) providing at least one carbohydrate component,
(ii) providing at least one polyamino acid component,
(iii) mixing in a solvent the carbohydrate component(s) and the polyamino acid component(s), and
(iv) reacting the carbohydrate component(s) and polyamino acid component(s) in the solution or dispersion obtained in step (iii).

According to the present invention, the method of manufacturing the pre-reacted binder composition may be carried out under the same conditions (i.e., components and ratios) as defined above with respect to the pre-reacted binder composition.

In a preferred embodiment, the preparation of the pre-reacted binder composition is carried out in a solvent, such as water, to directly yield a binder solution usable for storage, shipping or as a basis for preparing the final binder composition. For example, the pre-reacted binder composition may be prepared in a concentrated aqueous solution of the carbohydrate component and polyamino acid component. The thus obtained concentrated pre-reacted binder solution may then be used, for example, at a later time and/or a different place, e.g., by dilution and addition of a cross-linker, as an effective binder for consolidating loosely assembled matter.

According to a preferred embodiment of the present invention, the above steps (i) to (iv) are carried out while the carbohydrate component(s) and polyamino acid component(s) are not in contact with a collection of matter which is to be bound by a polymeric binder.

The temperature in step (iv) of the above method of manufacturing the pre-reacted binder composition of the present invention is not specifically restricted and includes temperatures in the range of 10° C. to 120° C., 15° C. to 110° C., 20° C. to 100° C. or 25° C. to 90° C. For example, the reaction temperature may range from 25° C. to 85° C., 30° C. to 80° C., 35° C. to 75° C. or 40° C. to 70° C. Specific examples of the temperature range include 40° C. to 90° C., 45° C. to 85° C. and 50° C. to 75° C. According to the present invention, the temperature at which the pre-reacted binder composition is prepared is not limited to the above ranges, and the upper and lower values of the aforementioned ranges may be freely combined.

According to one embodiment of the present invention, reaction step (iv) of the above method is carried out by reacting the carbohydrate component(s) and polyamino acid component(s) at a temperature of at most 120° C., e.g., of at most 115° C., at most 110° C., at most 105° C., at most 100° C., at most 95° C., at most 90° C., at most 85° C. or at most 80° C.

Illustratively, pre-reaction of a carbohydrate-polyamino acid binder system exemplified by glucose-lysine formulations highlighted an improvement in cure rate as a result of pre-reaction that apparently coincided with the production of carbon dioxide ($CO_2$). Without wishing to be bound by theory, it is believed that the improvement in cure rate (i.e., increasing the rate of cure) of such a carbohydrate-polyamino acid-based pre-reacted binder composition, and such compositions in general, may be the result of decarboxylation of the polyamino acid component to afford the corresponding polyamine (i.e., lysine to cadaverine in a glucose-lysine binder formulation) with a concomitant doubling of amino groups available for reaction with the carbohydrate component. Mechanistically, decarboxylation would be expected to diminish, if not prevent, protonation of an $\alpha$-, $\beta$-, $\gamma$-, $\delta$-, $\epsilon$-, $\zeta$-, and/or $\omega$-amino group within a diaminoalkyl carboxylic acid (i.e., polyamino acid) that would otherwise be accomplished by an $\alpha$-carboxyl group. Again without wishing to be bound by theory, it is believed that reagents (e.g., transition metal-containing compounds) capable of accelerating (i.e., catalyzing) and/or that accelerate decarboxylation of the polyamino acid component to afford the corresponding polyamine should further improve (i.e., increase) the cure rate of carbohydrate-polyamino acid-based pre-reacted binder compositions.

Similarly, the duration of reacting the carbohydrate component(s) and polyamino acid component(s) in reaction step (iv) in the above method is not specifically restricted and includes durations of 5 minutes to 240 minutes, 5 minutes to 210 minutes, 5 minutes to 180 minutes, 5 minutes to 150 minutes, 5 minutes to 120 minutes, 5 minutes to 90 minutes, 5 minutes to 75 minutes 5 minutes to 60 minutes, 5 minutes to 40 minutes, 5 minutes to 30 minutes and 5 minutes to 25 minutes. Further examples include durations of 5 minutes to 240 minutes, 10 minutes to 240 minutes, 15 minutes to 240 minutes, 20 minutes to 240 minutes, 25 minutes to 240 minutes, 30 minutes to 240 minutes, 40 minutes to 240 minutes, 45 minutes to 240 minutes, 60 minutes to 240 minutes, 120 minutes to 240 minutes and 180 minutes to 240 minutes. However, durations of up to one, two, three, four, five and six days, as well as durations of one, two or three weeks may also be reasonable within the scope of the present invention. According to the present invention, the duration for preparing the pre-reacted binder composition as defined above is not limited to the above examples and the upper and lower values of the aforementioned ranges may be freely combined herein.

According to one embodiment of the present invention, reaction step (iv) is carried out by reacting the carbohydrate component(s) and polyamino acid components for a period of at most 96 hours, e.g. of at most 90 hours, at most 85 hours, at most 80 hours, at most 75 hours, at most 70 hours, at most 65 hours, at most 60 hours, at most 55 hours, at most 50 hours, at most 45 hours, at most 40 hours, at most 35 hours, at most 30 hours, at most 25 hours, at most 20 hours, at most 15 hours, at most 10 hours, at most 5 hours or at most 3 hours. Reaction step (iv) may be carried out by reacting the carbohydrate component(s) and polyamino acid component(s) for a period of at least 5 minutes 10 minutes, 15 minutes, 20 minutes, 25 minutes, 30 minutes, 40 minutes, 60 minutes, 120 minutes or 180 minutes.

According to a specific embodiment of the present invention, reaction step (iv) is carried out by reacting the carbohydrate component(s) and polyamino acid component(s) at a temperature range of 40° C. to 120° C. for a period of 5 minutes to 180 minutes.

According to another specific embodiment of the present invention, reaction step (iv) is carried out by reacting the carbohydrate component(s) and polyamino acid component(s) at a temperature range of 20° C. to 30° C. for a period of 1 hour to 96 hours.

According to the present invention, the duration and temperature for carrying out reaction step (iv) in the above method is not limited to the above examples and the upper and lower values of the aforementioned ranges may be freely combined herein.

According to a further embodiment of the present invention, the viscosity of the solution or dispersion during step (iv) of reacting the carbohydrate component(s) and the polyamino acid component(s) does not increase by more than 300 cP, when determined at 20° C. and a starting concentration of 70 wt.-% total carbohydrate and polyamino acid components present before step (iv). For example, the viscosity does not increase by more than 275 cP, more than 250 cP, more than 225 cP, more than 200 cP, more than 175 cP, more than 150 cP, more than 100 cP, more than 75 cP, or more than 50 cP.

The reaction step (iv) may be carried out at or substantially at atmospheric pressure, for example in an open reaction vessel. Alternatively, the reaction step (iv) may be carried out in a closed reaction vessel; it may be carried out at a pressure above atmospheric pressure.

According to another aspect, the present invention relates to a water-soluble pre-reacted binder composition obtainable by the method as defined above.

For example, one embodiment of the present invention relates to the pre-reacted binder composition as defined above, wherein the binder-composition is obtainable by reacting in a solvent the at least one carbohydrate component with the at least one polyamino acid component at a temperature of at least 10° C. for a period of at least 5 minutes.

According to another aspect, the present invention relates to a use of the water-soluble pre-reacted binder composition as defined above in the manufacture of a product comprising a collection of matter bound by a polymeric binder.

As used herein, the term "collection of matter" is not particularly restricted and includes any collection of matter which comprises fibres selected from the group consisting of mineral fibres (including slag wool fibres, stone wool fibres, glass fibres), aramid fibres, ceramic fibres, metal fibres, carbon fibres, polyimide fibres, polyester fibres, rayon fibres, and cellulosic fibres. Further examples of a collection of matter include: particulates such as coal, sand; cellulosic fibres; wood shavings, sawdust, wood pulp, ground wood, wood chips, wood strands, wood layers; other natural fibres such as jute, flax, hemp, and straw;

wood veneers; facings; wood facings, particles, woven or non-woven materials (e.g., comprising fibres, notably of the type(s) referred to above).

A further aspect of the present invention relates to a method of manufacturing a collection of matter bound by a polymeric binder comprising the steps:
  (i) providing a collection of matter,
  (ii) providing the above-defined pre-reacted binder composition, or a pre-reacted binder composition obtained by the method as defined above, in a solvent to obtain a solution or dispersion,
  (iii) applying the solution or dispersion obtained in step (ii) to the collection of matter, and
  (iv) applying energy to the collection of matter containing said solution or dispersion to cure the binder composition.

The step (iv) of applying energy to the collection of matter as defined in the above method is not particularly restricted and includes, for example, heating in an oven at a temperature of 100° C. to 350° C., depending on the type of matter, the amount of binder and other conditions.

According to one embodiment of the above method, in step (ii) a cross-linker is added to the pre-reacted binder composition as defined above or the pre-reacted binder composition obtained by the method as defined above, or the solution or dispersion thereof.

In a further embodiment of the above-defined method of manufacturing a collection of matter, the pre-reacted binder composition as defined above or the pre-reacted binder composition obtained by the method as defined above has been aged for at least 24 hours before the cross-linker is added in step (ii). Further examples include ageing periods of at least 48 hours, at least 72 hours, at least 96 hours, at least one week, two weeks or three weeks, or at least one month or two months.

According to the present invention, the pre-reacted binder composition may change over time in its chemical composition by continuing the reaction between the carbohydrate component and the polyamino acid component. For example, even at relatively low temperatures, such as room temperature (20° C.) or below, Maillard-type reactions may continue between the carbohydrate component and the polyamino acid component towards the formation of melanoidins. As a consequence, aging of the pre-reacted binder composition may lead to an accelerated final curing process of the binder and/or to improved bond strength.

According to a further embodiment of the above-defined method of manufacturing a collection of matter, prior to the step of applying the solution or dispersion obtained in step (ii) to the collection of matter, the collection of matter is substantially free of binder.

A further aspect of the present invention relates to a binder solution or dispersion comprising in a solvent the pre-reacted binder composition as defined above and a cross-linker.

The pre-reacted binder composition solution or dispersion, particularly in the state applied to the material to be bound, may comprise:
at least 5% 10%, 15% or 18% solids and/or
less than 80%, 70% or 60% (particularly in the case of wood board applications) or less than 50%, 40% or 20% solids (particularly in the case of mineral fibre insulation applications),
particularly determined as bake out solids by weight after drying at 140 CC for 2 hours.

According to a further aspect, the present invention relates to a fibre- or particle-containing product comprising one or more types of fibres and/or particles and the pre-reacted binder composition as defined above in a cured state.

Binders in accordance with the present invention may be used as binders, e.g., in articles selected from the group consisting of: thermal insulation materials; mineral wool insulation (including glass wool insulation and stone wool insulation); wood boards; fibreboards; wood particle boards; chip boards; orientated strand board; medium density fibreboards; plywood; and high pressure laminates.

The quantity of binder in the finished product, particularly in the case of mineral wool insulation, may be:
Greater than: 1%, 2%, 2.5%, 3%, 3.5% or 4%; and/or
Less than: 20%, 15%, 10% or 8%
measured by dry weight of the finished product.

The quantity of binder for mineral wool insulation is typically measured by loss on ignition (LOI).

Particularly in the case of mineral fibre insulation products, the products may have one or more of the following parting strengths:
Ordinary Parting Strength of
At least 120 g/g, preferably at least 150 g/g; and/or
Less than 400 g/g
Weathered Parting Strength of
At least 120 g/g, preferably at least 150 g/g; and/or
Less than 400 g/g
% loss between Ordinary and Weathered Parting Strength of
Less than 10%, preferably less than 5%

The parting strength is expressed in grams/gram being the total breaking load of six test specimens divided by their total weight.

The test is carried out on mineral fibre mats as received for testing (Ordinary Parting Strength) and after an accelerated weathering test as explained below (Weathered Parting Strength).

Figure 14:
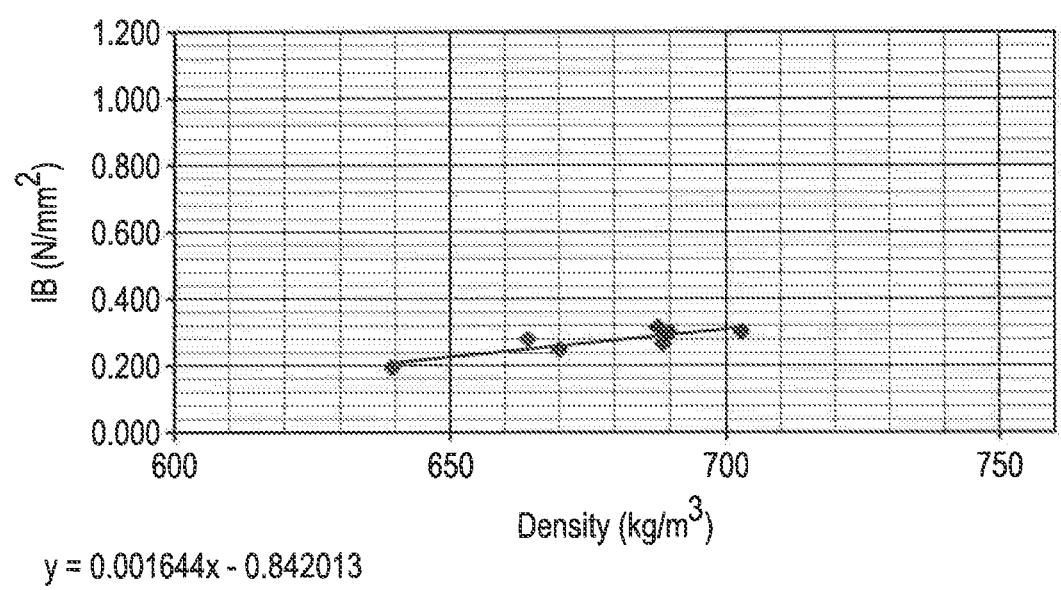
FIG. 14 shows: Internal bond strength as a function of density for particle board prepared with pre-reacted 65/35 Xylose/Lysine binder formulation.

A first set of six samples of the form and dimensions shown in FIG. 14 are cut from the mineral fibre mat to be tested. The dimensions are:
r: radius 12.7 mm;
DC: distance between centres 44.5 mm;
a: 25.4 mm;
b: 121 mm.

The long axis of the samples should be parallel to the conveyor direction and the samples should be taken across the full width of the mineral mat. A second set of six samples is then taken in the same way.

The total weight of the first group of six samples W1 in grams is recorded.

The total weight of the second group of six samples W2 in grams is recorded; these samples are then placed in a preheated autoclave and conditioned on a wire mesh shelf away from the bottom of the chamber under wet steam at 35 kN/m² for one hour. They are then removed, dried in an oven at 100'C for five minutes and tested immediately for parting strength.

To test the parting strength, each sample is mounted in turn on the jaws of a 5500 Instron tensile strength machine and the maximum breaking load in grams or Newtons is recorded. If the breaking load is measured in Newtons it is converted to grams by multiplying it by 101.9. Six results in grams are obtained for each set of samples: G1 G2 G3 G4 G5 and G6 for the first set of samples and G7 G8 G9 G10 G11 and G12 for the second set of samples.

The Ordinary Parting Strength is calculated from the first set of samples using the formula Ordinary Parting Strength= (G1+G2+G3+G4+G5+G6)/W1.

The Weathered Parting Strength is calculated from the second set of samples using the formula Weathered Parting Strength=(G7+G8+G9+G10+G11+G12)/W2.

Where the product is mineral wool insulation it may have one or more of the following characteristics:
A density greater than 5, 8 or 10 kg/m³;
A density less than 200, 180 or 150 km/m³
Comprise glass wool fibres and have a density greater than 5, 8 or 10 kg/m³ and/or less than 80, 60 or 50 kg/m³;
Comprise stone wool fibres and have a density greater than 15, 20 or 25 kg/m³ and/or less than 220, 200 or 180 kg/m³;
A thermal conductivity λ of less than 0.05 W/mK and/or greater than 0.02 W/mK
Comprise less than 99% by weight and/or more than 80% by weight mineral fibres.

A thickness of greater than 10 mm, 15 mm or 20 mm and/or less than 400 mm, 350 mm or 300 mm.

Where the product is wood board product, it may have one or more of the following characteristics:

Dimensions of at least 50 cm×80 cm, preferably at least 1 m×2 m

Thickness of at least 11 mm, 12 mm or 15 mm

A curing time of less than 25, 15, 12, 10, 5 or 1.5 minutes or, alternatively, less than 20 s/mm, 16 s/mm, 12 s/mm, 8 s/mm, or 6 s/mm An internal bond strength measured in accordance with EN319 of at least: 0.4 N/mm$^2$ or 0.45 N/mm$^2$ (particularly for particle board or fibre boards) or measured in accordance with EN300 of at least 0.28 N/mm$^2$ (particularly for orientated strand board)

A thickness swelling after 24 hours in water at 20° C. according to EN317 of less than 12%, preferably less than 10%;

Notably for particle board or OSB, a thickness swelling in accordance with EN317 in line with the specifications given in EN312 or EN300;

Notably for single-layer panels, for example single-layer lab panels made in a laboratory press, notably using 6% binder (dry weight on dry wood), notably at 70% formulation solids and notably pressing for 12 s/mm, a thickness swelling in 24 hr of no more than 50%, preferably less than 40%, and more preferably less than 30% (notably when no other additives are included);

A water absorption after 24 hours in water at 20° C. of less than 40%, preferably less than 30%;

A modulus of elasticity according to EN310 of at least: 1800 N/mm$^2$ (particularly for particle board or fibre boards) or 2500 N/mm$^2$ (particularly for orientated strand board) or 3500 N/mm$^2$ or 4800 N/mm$^2$;

A bending strength (MOR) of at least: 14 N/m$^2$ (particularly for particle board or fibre boards) or 18 N/mm$^2$ (particularly for orientated strand board) or 20 N/mm$^2$ or 28 Nimm$^2$:

Wax as an additive, for example in the range 0.1 to 2% by weight, preferably 0.5 to 1% by weight;

A binder content (weight of dry resin to weight of dry wood particles) in the range 8 to 18% by weight, preferably 10 to 16% by weight, more preferably 12 to 14% by weight;

A binder content, notably for surface layers, (weight of dry resin to weight of dry wood particles) in the range 6 to 15% by weight, preferably 8 to 13% by weight, more preferably 10 to 12%;

A binder content, notably for core layers, (weight of dry resin to weight of dry wood particles) in the range 4 to 12% by weight, preferably 5 to 10% by weight, more preferably 6 to 8%;

Be cured in a press, particularly between plates or platens having a temperature of greater than 180° C., preferably greater than 190° C. or 200° C. and/or less than 350° C., preferably less than 280° C. or less than 260° C., or less than 240° C.

Various additives can be incorporated into binder compositions of the present invention. These additives give the binders of the present invention additional desirable characteristics. For example, the binder may include a silicon-containing coupling agent. Many silicon-containing coupling agents are commercially available from the Dow-Corning Corporation, Evonik Industries, and Momentive Performance Materials. Illustratively, the silicon-containing coupling agent includes compounds such as silylethers and alkylsilyl ethers, each of which may be optionally substituted, such as with halogen, alkoxy, amino, and the like. In one variation, the silicon-containing compound is an amino-substituted silane, such as, gamma-aminopropyltriethoxy silane (SILQUEST A-1101; Momentive Performance Materials, Corporate Headquarters: 22 Corporate Woods Boulevard, Albany, N.Y. 12211 USA). In another variation, the silicon-containing compound is an amino-substituted silane, for example, aminoethylaminopropyltrimethoxy silane (Dow Z-6020; Dow Chemical, Midland, Mich.; USA). In another variation, the silicon-containing compound is gamma-glycidoxypropyltrimethoxysilane (SILQUEST A-187; Momentive). In yet another variation, the silicon-containing compound is an aminofunctional oligomeric siloxane (HYDROSIL 2627, Evonik Industries, 379 Interpace Pkwy, Parsippany, N.J. 07054).

The silicon-containing coupling agents are typically present in the binder in the range from about 0.1 percent to about 1 percent by weight based upon the dissolved binder solids (i.e., about 0.05% to about 3% based upon the weight of the solids added to the aqueous solution). These silicone containing compounds enhance the ability of the binder to adhere to the matter the binder is disposed on, such as glass fibres Enhancing the binder's ability to adhere to the matter improves, for example, its ability to produce or promote cohesion in non- or loosely-assembled substance(s).

In another illustrative embodiment, a binder of the present invention may include one or more corrosion inhibitors. These corrosion inhibitors prevent or inhibit the eating or wearing away of a substance, such as, metal caused by chemical decomposition brought about by an acid. When a corrosion inhibitor is included in a binder of the present invention, the binder's corrosivity is decreased as compared to the corrosivity of the binder without the inhibitor present. In one embodiment, these corrosion inhibitors can be utilized to decrease the corrosivity of the mineral fibre-containing compositions described herein. Illustratively, corrosion inhibitors include one or more of the following, a dedusting oil, or a monoammonium phosphate, sodium metasilicate pentahydrate, melamine, tin(II) oxalate, and/or methylhydrogen silicone fluid emulsion. When included in a binder of the present invention, corrosion inhibitors are typically present in the binder in the range from about 0.5 percent to about 2 percent by weight based upon the dissolved binder solids.

In another illustrative embodiment, a binder of the present invention may include de-dusting oils for mineral wool and waxes (as a water repellent) for wood board.

According to one embodiment, a fibre or particle-containing product as defined above is obtainable by the method of manufacturing a collection of matter as defined above.

According to a specific embodiment, the fibre or particle-containing product contains one or more fructosazines. Preferably, said one or more frutosazines are present in an amount of from 0.001 to 5 wt.-%, e.g. from 0.01 to 5 wt.-%, from 0.05 to 5 wt.-%, from 0.1 to 5 wt.-%, from 0.15 to 5 wt.-%, from 0.2 to 5 wt.-%, from 0.25 to 5 wt.-%, from 0.3 to 5 wt.-%, from 0.4 to 5 wt.-%, from 0.5 to 5 wt.-%, from 0.75 to 5 wt.-%, from 1 to 5 wt.-%, from 1.5 to 5 wt.-%, from 2 to 5 wt.-%, or from 2.5 to 5 wt.-%. Further examples include ranges of from 0.01 to 4.5 wt.-%, from 0.01 to 4 wt.-%, from 0.01 to 3.5 wt.-%, from 0.01 to 3 wt.-%, from 0.01 to 2.5 wt.-%, from 0.01 to 2 wt.-%, from 0.01 to 1.5 wt.-%, from 0.01 to 1 wt.-% or from 0.01 to 0.75 wt.-%. According to the present invention, the amount at which the one or more fructosazines are contained in the fibre or particle-containing product of the present invention is not limited to the above ranges, and the upper and lower values of said ranges may be freely combined.

The pre-reacted binder composition of the present invention advantageously overcomes a variety of drawbacks known from common carbohydrate-based binders. Particularly, preferred embodiments of the pre-reacted binder composition may be stored or shipped for a prolonged time without recrystallization of the carbohydrate component or gelling which would render the binder composition unusable. Moreover, preferred embodiments of the pre-reacted binder composition of the present invention result in improved cure times, improved bond strength and reduced fading, e.g., of resulting fibre products. By using preferred embodiments of the pre-reacted binder composition of the present invention, fibre- or particle-containing products can be obtained which have a reduced content of unreacted carbohydrate components, so that they are more stable against microbial degradation.

The present invention will be further illustrated in the following examples, without limitation thereto.

Example 1: General Procedure for Testing Cure Rate

The Maillard reaction takes place in three major steps:
1. Formation of Amadori intermediate (before the absorbance starts increasing)
2. Polymerization (absorbance increases)
3. Cross linking (absorbance decreases)

The cross linking step of the Maillard reaction makes the binder less and less soluble, therefore absorbance decreases.

Fifty (50) ul samples of binders to be compared (at the same solids, generally 20-30% to keep sg similar) are spotted onto a strip of GFA filter paper and placed in an oven at a set temperature (generally, 140° C.) for 2 minutes and then removed; this heating process is repeated for 3 minutes, 4 minutes, 5 minutes and so on. The spotted samples are then cut out and each sample is left to leach out into a 50-g beaker of water in an ultrasound bath for 15 minutes. The 50 g of leached water is then analysed in a photometer by measuring absorbance at 470 nm ($A_{470}$), which is recorded as shown in FIG. 1. The gradual increase in absorbance represents the early stage of the curing reaction where browning takes place, but where the products are still water-soluble; the peak in absorbance represents the tipping point whereby polymerization takes precedence over browning, and the binder starts becoming water insoluble. As can be seen in FIG. 1, at 110° C. an 80/20 Glucose/HMDA binder does not reach a point of polymerization; it does, however, at 120° C. and higher temperatures. Fast-curing binders have lower $A_{470}$ peaks due to polymerization occurring very early on in the reaction, thereby resulting in less browning at any given time. Generally, cure rate is determined by how fast a given binder reaches its baseline ($A_{470}$ maximum) and how low the baseline is.

Example 2: Comparison of Pre-Reacted Binder Compositions of lysine/dextrose+/−triethanolamine Versus HMDA/dextrose Of the 23 naturally-occurring amino acids, lysine is the most similar in structure to HMDA in that lysine is a diamine, i.e., a polyamino acid, with a chain length of 5 carbons separating the two amino groups, while HMDA is a polyamine having a chain length of 6 carbons separating the two amino groups. However, unlike HMDA, in which both terminal amine groups appear to be fully deprotonated during curing conditions, the lysine molecule requires a high pH environment to achieve the same level of amine reactivity presumably due to protonation of the lysine α-amino group and/or ε-amino group by the α-carboxyl group (thereby creating a Zwitterion). Such a pH environment can be accomplished, for example, by adding HMDA as a cross-linker to a pre-reacted lysine/dextrose binder composition, as described above, in order to buffer the composition to a suitably high pH. Without wishing to be bound by theory, the presence of an α-carboxyl group in a polyamino acid component, while perhaps being a detriment to initial amino group reactivity, may be beneficial to (i.e., promote) and participate in esterification processes that occur downstream in the Maillard reaction. Such esterification processes would also be expected to liberate the lysine α-amino group and/or ε-amino group thereby enabling both amino groups to participate in Maillard chemistry with a concomitant increase in cure rate, wet bond strength and/or dry bond strength.

In order to identify alternatives to HMDA for increasing the pH of pre-reacted binder compositions and thereby fully deprotonate both amino groups on the lysine molecule, metal hydroxides such as sodium hydroxide, potassium hydroxide and calcium hydroxide were added to the binder formulation to increase pH. Although the resulting formulations browned much faster than the corresponding lower pH starting formulations, thereby indicating a faster initial Maillard reaction, upon curing in the oven at 140° C. no polymerisation took place. This was likely attributable to the higher ionic content of the binder imparted by the metal hydroxides resulting in formation of salts with some of the Maillard reaction products (MRP), i.e., with organic acids such as acetic acid and formic acid which are known Maillard intermediates. Based on the results obtained with metal hydroxides, Lewis/Lowry-type organic bases were contemplated, which were expected to increase the formulation pH while imparting minimal ionic properties to the binder and eliminating the formation of metal acetates/formates. As a non-limiting, representative example, the inclusion of triethanolamine (TEA) was found to improve cure rate; as such it is expected that other Lewis/Lowry bases may be used to adjust, i.e., increase, the pH of polyamine acid-containing pre-reacted binder compositions of the present invention.

Binder Preparation

All lysine-containing binder formulations were prepared by making up to 70% solids and pre-reacting at 60° C. for 30 minutes; this was done to ensure the early stages of the Maillard reaction were carried out prior to curing. The formulations were then diluted to 35% binder solids, which formulations were then used for subsequent curing and bond strength testing. HMDA-containing formulations were made up to 35% solids at the start and pre-reacted for 30 minutes to prevent any gelling which typically occurs at 70% solids. No gelling was observed under any conditions using any lysine-containing binders.

Cure Rate Testing

The following formulations were made up for cure rate testing; Lysine binders at 70% solids were diluted to 35% solids after a 30 minute pre-reaction at 60° C.:

Calculations for Cure rates

| Sample number | Sample Description | Ratio Glu/Fru | Ratio Lys/HMDA | Ratio TEA | Solids | Batch weight | Total solids | Total sugar | Total Lys/HMDA | Total TEA |
|---|---|---|---|---|---|---|---|---|---|---|
| 1 | HMDA 90/10 | 90.00% | 10.00% | 0.00% | 35.00% | 20 | 7 | 6.3 | 0.7 | 0 |
| 2 | HMDA 85/15 | 85.00% | 15.00% | 0.00% | 35.00% | 20 | 7 | 5.95 | 1.05 | 0 |
| 3 | HMDA 80/20 | 80.00% | 20.00% | 0.00% | 35.00% | 20 | 7 | 5.6 | 1.4 | 0 |
| 4 | Lysine 60/40 | 60.00% | 40.00% | 0.00% | 70.00% | 20 | 14 | 8.4 | 5.6 | 0 |
| 5 | Lysine 70/30 | 70.00% | 30.00% | 0.00% | 70.00% | 20 | 14 | 9.8 | 4.2 | 0 |
| 6 | Lysine 9% TEA | 63.60% | 27.30% | 9.10% | 70.00% | 20 | 14 | 8.904 | 3.822 | 1.274 |
| 7 | Lysine 17% TEA | 58.30% | 25.00% | 16.70% | 70.00% | 20 | 14 | 8.162 | 3.5 | 2.338 |
| 8 | Lysine 23% TEA | 53.80% | 23.10% | 23.10% | 70.00% | 20 | 14 | 7.532 | 3.234 | 3.234 |

Actual weights used

| Sample number | Sample | Glucose at 90.9% purity | Fructose at 100% purity | Lysine at 98%/ HMDA at 70% purity | TEA at 100% purity | Water |
|---|---|---|---|---|---|---|
| 1 | HMDA 90/10 | 3.47 | 3.15 | 1.00 | 0.00 | 12.38 |
| 2 | HMDA 85/15 | 3.27 | 2.98 | 1.50 | 0.00 | 12.25 |
| 3 | HMDA 80/20 | 3.08 | 2.80 | 2.00 | 0.00 | 12.12 |
| 4 | Lysine 60/40 | 4.62 | 4.20 | 5.71 | 0.00 | 5.47 |
| 5 | Lysine 70/30 | 5.39 | 4.90 | 4.29 | 0.00 | 5.42 |
| 6 | Lysine 9% TEA | 4.90 | 4.45 | 3.90 | 1.27 | 5.48 |
| 7 | Lysine 17% TEA | 4.49 | 4.08 | 3.57 | 2.34 | 5.52 |
| 8 | Lysine 23% TEA | 4.14 | 3.77 | 3.30 | 3.23 | 5.56 |

Notes:
1. After dilution to 35% solids, a solids test was carried out and results recorded.
2. 85 ul aliquots of 35% formulations 3, 4, 5, 6, 7 and 8 were spotted on multiple glass microfilter papers according to the standard method and cured in an oven at 120° C. for varying amounts of time.
3. Glass microfilter paper samples were then analysed according to the standard method, and results recorded.
4. The above was repeated using formulations 1, 2, 3, 4, 5 and 7 at an oven curing temperature of 140° C.

Bond Strength Testing

The following formulations were made up for bond strength testing; Lysine and HMDA/Glycine binders at 70% solids were diluted to 35% solids after a 30 minute pre-reaction at 60° C.:

Calculations for bond strength

| Sample Number | Sample Description | Ratio Glu/Fru | Ratio Lys/HMDA | Ratio TEA/Gly | Solids | Batch weight | Total solids | Total sugar | Total amine | Total TEA |
|---|---|---|---|---|---|---|---|---|---|---|
| 1 | HMDA 80/20 | 80.00% | 20.00% | 0.00% | 35.00% | 50 | 17.5 | 14 | 3.5 | 0 |
| 2 | Lysine 70/30 | 70.00% | 30.00% | 0.00% | 70.00% | 50 | 35 | 24.5 | 10.5 | 0 |
| 3 | Lysine 70/30 17% TEA | 58.30% | 25.00% | 17.30% | 70.00% | 50 | 35 | 20.405 | 8.75 | 6.055 |
| 4 | HMDA/ Glycine | 80.00% | 10.00% | 10.00% | 70.00% | 50 | 35 | 28 | 3.5 | 3.5 |

Actual Weights used

| Sample number | Sample Description | Glucose at 90.9% purity | Fructose at 100% purity | Lysine at 98%, HMDA at 70% purity | TEA at 100%, Glycine at 100% purity | Water |
|---|---|---|---|---|---|---|
| 1 | HMDA 80/20 | 7.70 | 7.00 | 5.00 | 0.00 | 30.30 |
| 2 | Lysine 70/30 | 13.48 | 12.25 | 10.71 | 0.00 | 13.56 |

Actual Weights used

| Sample number | Sample Description | Glucose at 90.9% purity | Fructose at 100% purity | Lysine at 98%, HMDA at 70% purity | TEA at 100%, Glycine at 100% purity | Water |
|---|---|---|---|---|---|---|
| 3 | Lysine 70/30 17% TEA | 11.22 | 10.20 | 8.93 | 6.06 | 13.59 |
| 4 | HMDA/Glycine | 15.40 | 14.00 | 5.00 | 3.50 | 12.10 |

Notes:
1. Preparation of shell bones was carried out in accordance with the standard method with the exception that 77 g of 35% binder was used in place of the 60 g of 45% binder as this gave a better binder consistency with the thicker pre-reacted formulations.
2. 6 shell bones of each formulation were dried overnight in a desiccator whilst the other 6 shell bones were weathered using a KOH solution at 50° C. overnight.
3. Bond strength was measured using the standard tensile method and results recorded.

Solids Content of Lysine Binder at 70/30 ratio

| Sample solids | W1 | W2 | W3 | Burnt out solids |
|---|---|---|---|---|
| 70% solids | 3.342 | 4. | 3.8546 | 49.2% |
| 70% solids | 3.3489 | 4.4618 | 3.8992 | 49.4% |
| 35% solids | 3.3347 | 4.3281 | 3.577 | 24.4% |
| 35% solids | 3.3017 | 4.2431 | 3.5307 | 24.3% |

Figure 2:
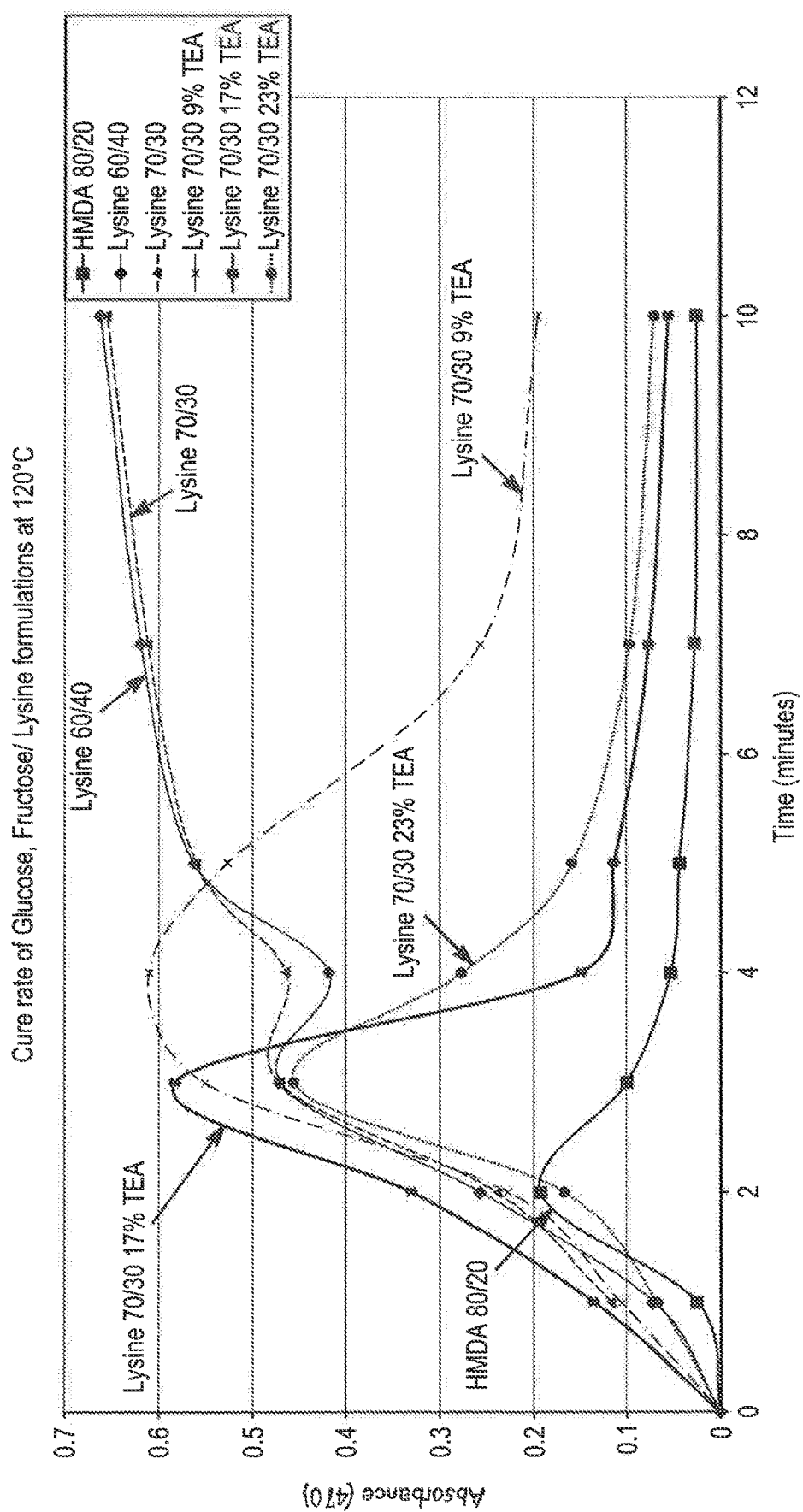
FIG. 2 shows: Cure rates of pre-reacted Glucose-Fructose/Lysine ± triethanolamine binder formulations vs. Glucose/HMDA formulations at 120° C.
Figure 3:
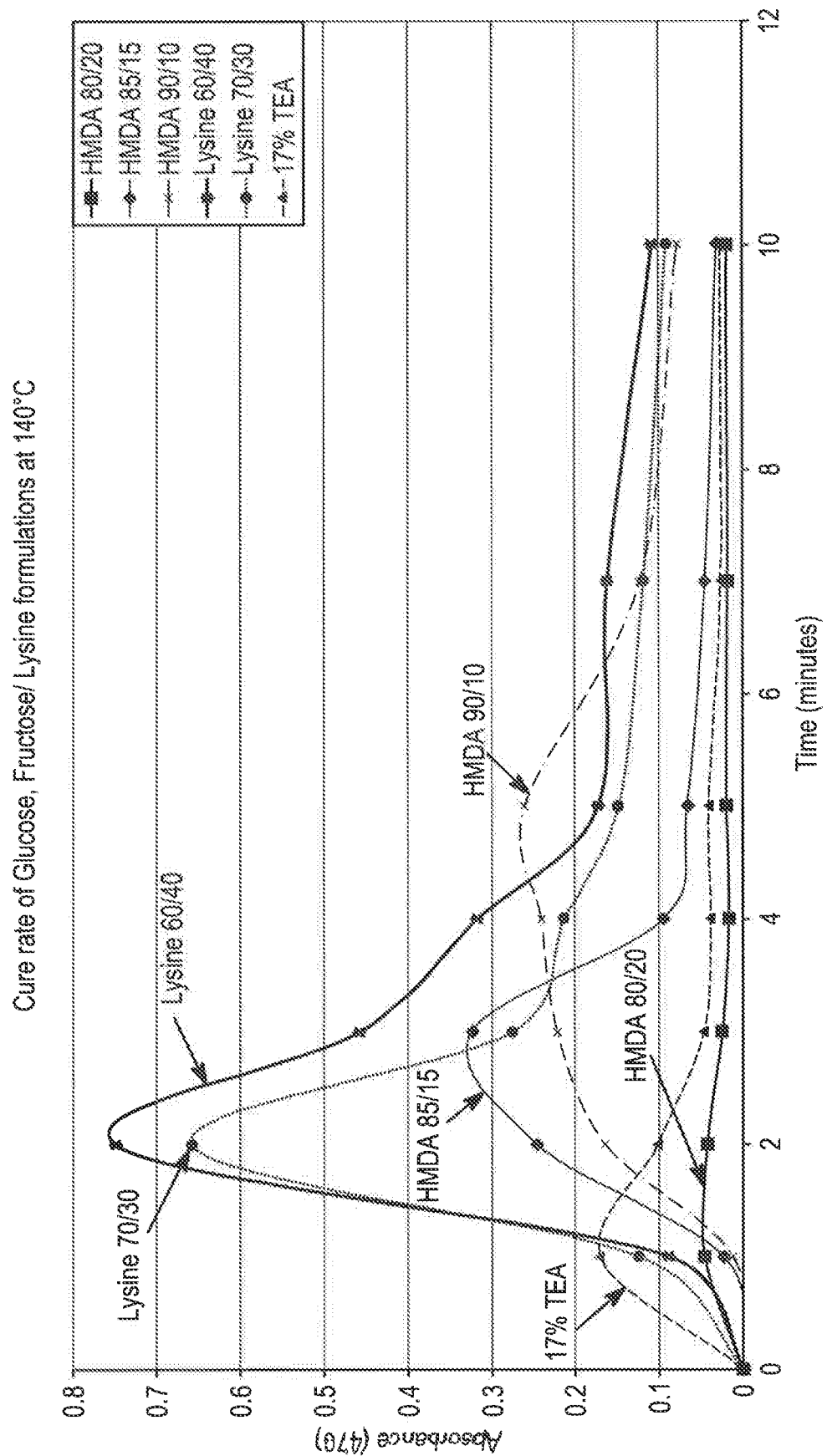
FIG. 3 shows: Cure rates of pre-reacted Glucose-Fructose/Lysine ± triethanolamine binder formulations vs. Glucose/HMDA formulations at 140° C.
Figure 4:
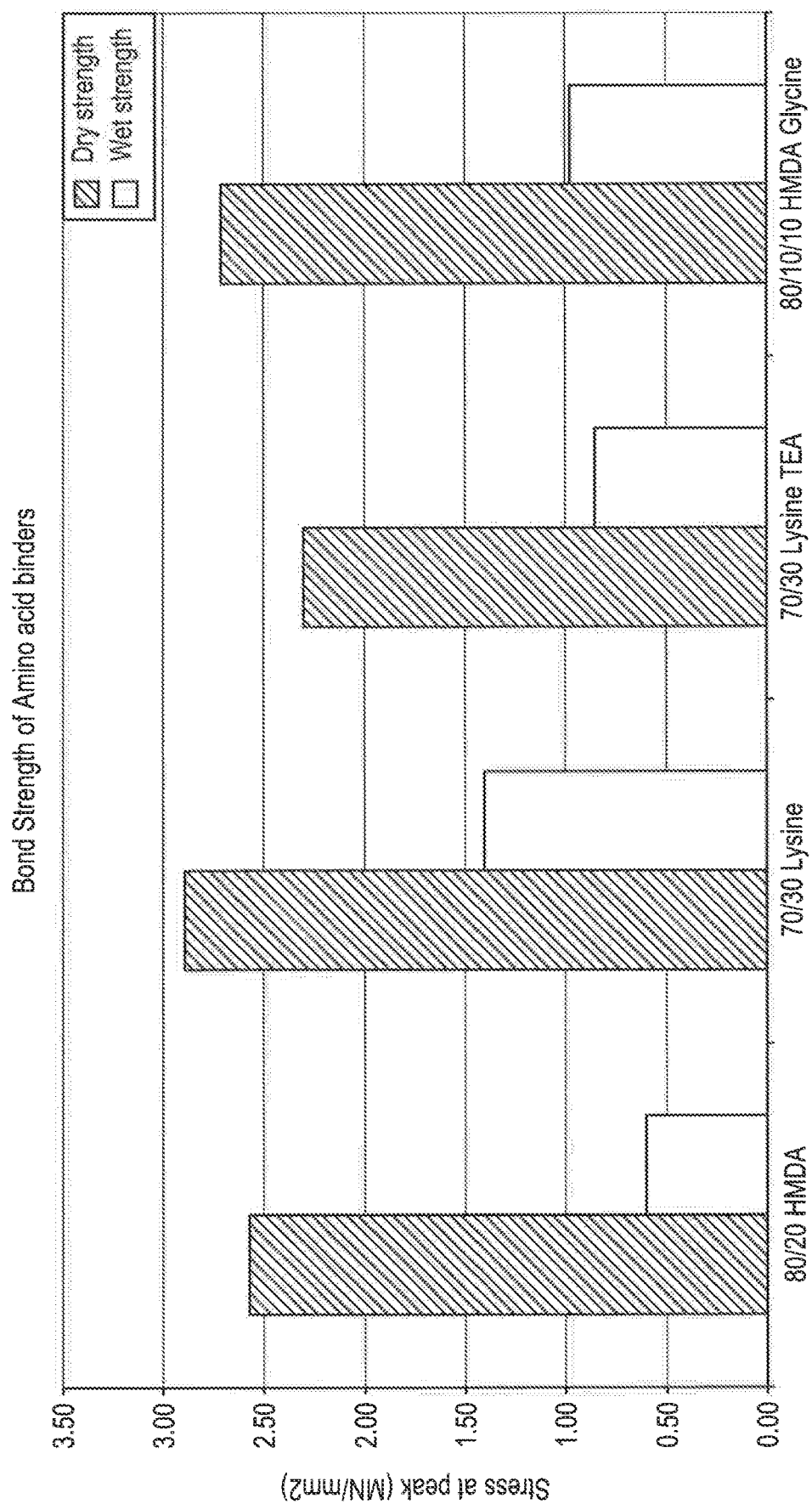
FIG. 4 shows: Bond strengths (dry strength and wet strength) of various Glucose- Fructose/Amino acid-based binders (determined via shell bone test)

Based on the Results:
1. Lysine-based binders yield end solids similar to those of HMDA-based binders
2. FIG. 2 shows that a lysine-based binder (60/40 and 70/30) without triethanolamine does not completely cure at 120° C., but at 4 minutes it does show signs of cross-linking.
3. Addition of 9% triethanolamine enables a lysine-based binder to cure; 17% triethanolamine provides the fastest cure similar to that of an HMDA-based binder whereas 23% triethanolamine affords a slower cure rate.
4. Without wishing to be bound by theory, an optimal amount of triethanolamine appears to be between 9% and 23%.
5. FIG. 3 shows that at 140° C. both lysine-based formulations without triethanolamine cross-link and cure fully; the 70/30 formulation cures faster than the 60/40 formulation.
6. A 70/30 lysine-based binder gives slightly higher dry bond strength and a wet bond strength almost 3 times higher than an HMDA-based binder (FIG. 4).
7. Addition of 17% triethanolamine to a 70/30 lysine-based binder lowers both the dry bond strength and wet bond strength; however, the wet bond strength is still higher than that of an HMDA-based binder.
8. The addition of glycine into the HMDA-based binder formulation increases dry bond strength slightly and wet bond strength almost doubles (FIG. 4).

Example 3: Comparison of Cure Rates at 130° C. for pre-reacted 70/30 Glucose/Lysine binders: Change in Cure Rate as a Function of Pre-Reaction (Reflux) Time and Effect of Pre-Reaction on Bond Strength Binder Preparation Lysine binder was made up at a 70/30 (w/w) ratio of Glucose/Lysine at 70% starting solids in a 2 litre round bottom flask with attached water condenser and water trap and placed inside an isomantle set to 110° C. The mixture was heated under agitation and a starting sample was taken once binder components were fully dissolved and mixed at 60° C. Upon further heating at ~80° C. the binder exothermed to 105° C. and produced large quantities of gas, the experiment was continually heated and stayed at a steady 105° C. throughout. Samples were taken at 1, 2 and 3 hours into the pre-reaction which was continued under reflux conditions, the binder eventually became too viscous to continue the reaction after 200 minutes.

Testing

Figure 5:
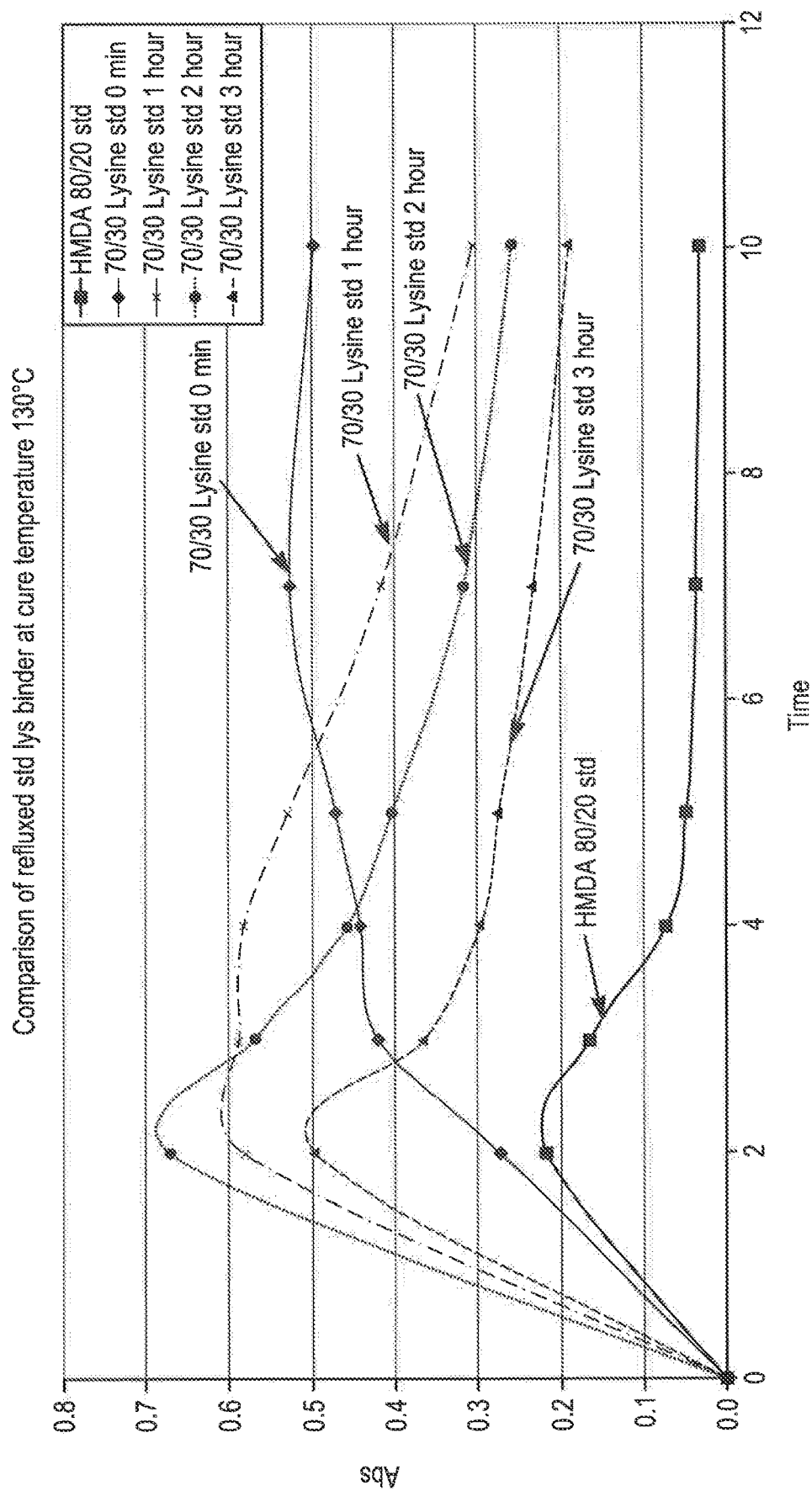
FIG. 5 shows: Comparison of cure rates at 130° C. for pre-reacted 70/30 Glucose/Lysine binders: Change in cure rate as a function of pre-reaction (reflux) time.

Each sample was tested for its cure rate as shown in FIG. 5, which demonstrates a change in cure rate over pre-reaction time. Specifically, FIG. 5 demonstrates a clear improvement in binder cure rate as the pre-reaction progresses (Le., as a function of pre-reaction time, or in this instance, reflux time).

Each sample was also tested for its pH and viscosity (sample diluted to 37.5% solids) using standard Ecose methods, and the results are shown below:

| Pre-reaction time | Viscosity at 37.5% solids (cP) | pH |
|---|---|---|
| 0 min | 8.22 | 8.91 |
| 1 hour | 9.99 | 4.78 |
| 2 hour | 16 | 4.52 |
| 3 hour | 38.8 | 4.42 |

The above results show: i) a pH drop during pre-reaction indicating a reaction between an amino group of the lysine with a glucose molecule, and ii) viscosity to increase during pre-reaction until binder became too viscous to continue the experiment.

Figure 6:
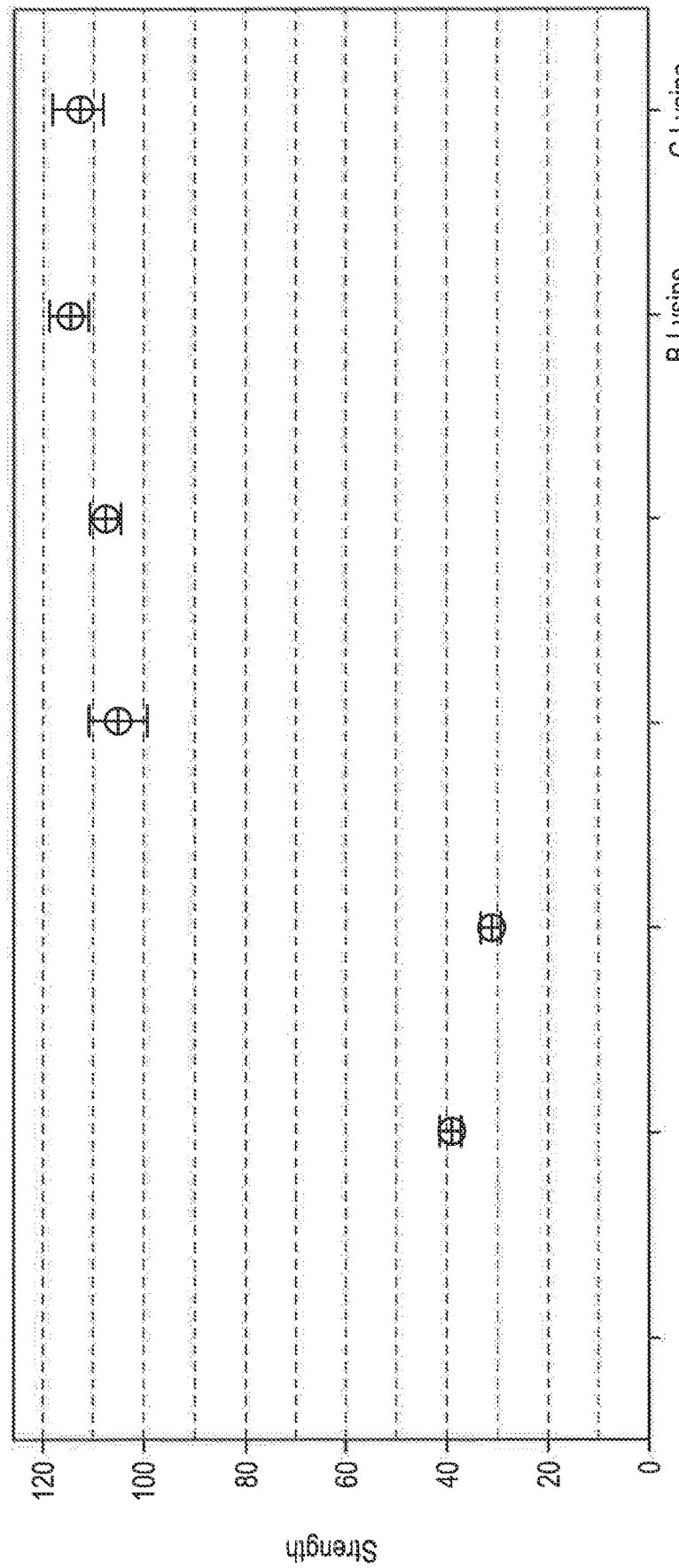
FIG. 6 shows: Comparison of cure rates at 130° C. for pre-reacted 70/30 Glucose/Lysine binders: Effect of pre-reaction on bond strength (determined via glass veil test)

The sample taken at 1 hour was tested for bond strength and compared to the starting lysine binder and a HMDA equivalent all at the same veil LOI, using the standard Ecose veil test. The test results, shown in FIG. 6, show the effect of pre-reaction on bond strength. Specifically, FIG. 6 demonstrates that, whereas an un-prereacted lysine binder has poor bond strength properties, after 1 hour of reflux the bond strength properties triple and exceed that of the standard glucose/HMDA binder.

Based on the Results:
1. Pre-reaction of the lysine binder improves cure rate but also increases viscosity of the binder due possibly to increased cross-linkage of the components.
2. Pre-reaction of the lysine binder greatly improves the bond strength, this could be due to a higher degree of cross-linking or the formation of a more reactive cadaverine (diamine) formed during decarboxylation of the lysine.

3. The production of large amounts of gas during the pre-reaction is likely to be carbon dioxide ($CO_2$) caused by decarboxylation of the lysine molecule during the Maillard reaction.

Example 4: Pre-Reaction of 70/30 Glucose/Lysine Binder: Confirmation of $CO_2$ Evolution, Determination of Rate of $CO_2$ Production, and Measurement of Viscosity Increase During Pre-Reaction Process Binder Preparation Lysine binder was made up at a 70/30 (w/w) ratio of Glucose/Lysine at 70% starting solids in a 2 litre round bottom flask with an attached water condenser and water trap filled with lime water and channelled into a gas flow meter; the round bottom flask was placed inside an isomantle set to 110° C. The mixture was heated under agitation and a starting sample was taken once binder components were fully dissolved and mixed at 60° C. Upon further heating at ~80° C. the binder exo-thermed to 105° C. and produced large quantities of gas; the experiment was continually heated and stayed at a steady 105° C. throughout. Samples were taken at regular intervals up to 210 minutes; the binder eventually became too viscous to continue the reaction after 220 minutes.

Testing

Each sample was tested for its pH and viscosity (sample diluted to 37.5% solids) using standard Ecose methods, and the results are shown below:

| Pre-reaction Time | pH | Viscosity at 37.5% solids (Cp) |
|---|---|---|
| 0 | 9.06 | 8 |
| 30 | 5.12 | 9 |
| 60 | 4.66 | 10 |
| 90 | 4.48 | 13 |
| 120 | 4.41 | 18 |
| 150 | 4.34 | 21 |
| 180 | 4.35 | 42 |
| 210 | 4.31 | 118 |

The above results show: i) a pH drop during pre-reaction indicating a reaction between an amino group of the lysine with a glucose molecule, and ii) viscosity increases during pre-reaction, most dramatically near the end of the pre-reaction, until the binder became too viscous to continue the experiment.

Figure 7:
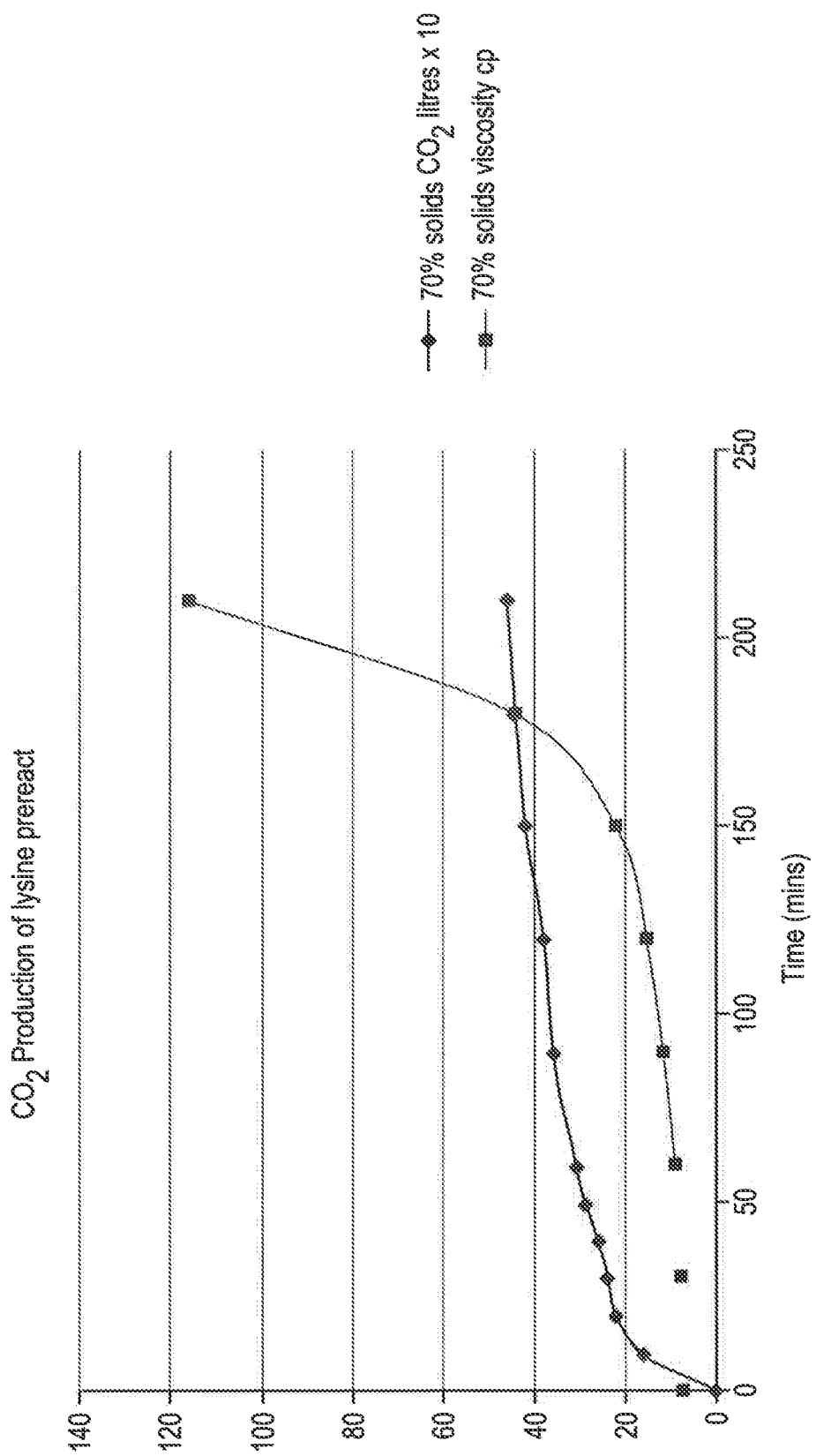
FIG. 7 shows: Confirmation of $CO_2$ evolution, determination of rate of $CO_2$ production, and measurement of viscosity increase during pre-reaction of 70/30 Glucose/Lysine binder.

FIG. 7 shows that a large volume of gas was produced throughout the pre-reaction experiment; the water trap filled with limewater turned milky during throughput of gas thereby confirming $CO_2$ as the gas being produced. In total 4.6 litres of $CO_2$ were produced.

Based on the Results:

The data, combined with the data from Example 3, show that the cure rate/bond strength increase coincide with $CO_2$ production in the pre-reacting binder. This is interesting because a pre-reaction carried out on HMDA under reflux does not produce $CO_2$ and does not improve cure rate. Therefore this shows a possible mechanism in which the pre-reaction works by potentially decarboxylating the lysine molecule into the much faster diamine cadaverine under Maillard conditions.

Figure 8:
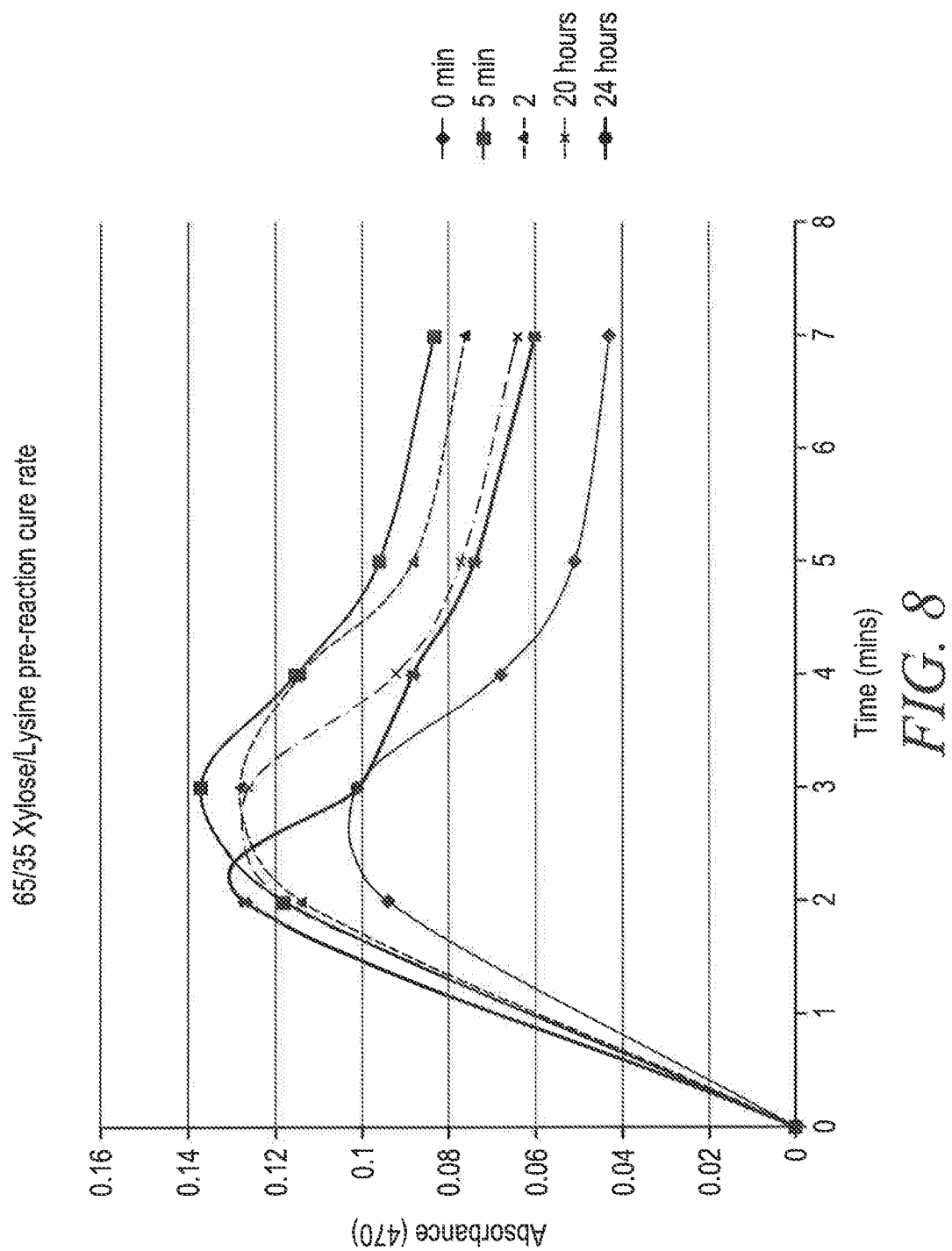
FIG. 8 shows: Comparison of cure rates at 130° C. for pre-reacted 65/35 Xylose/Lysine binders as a function of time.

Example 5: Comparison of Cure Rates at 130° C. for Pre-Reacted 65/35 Xylose/Lysine Binders as a Function of Time Binder formulations of 65/35 Xylose/Lysine were subjected to pre-reaction conditions, which included initial heating of the formulations at 70% solids to 80° C., at which point the formulations (mixtures) were observed to exotherm to ~105° C. as the majority of the carbon dioxide ($CO_2$) bubbled off. Analysis of such mixtures before heating and 5 minutes after the exotherm indicated that all of the xylose had reacted within the first 5 minutes. After 5 minutes, the loss of water/$CO_2$ afforded a formulation (mixture) at ~90% starting solids (based on weight) at which point the binder formulations were cooled to 40° C. and left to continue pre-reacting at a lower temperature over a several hour period (see, FIG. 8). The cure curve in FIG. 8 indicates that the lysine standard, i.e., the 65/35 Xylose/Lysine binder formulation before pre-reaction, appears to cure faster than the pre-reacted formulations. However, the lysine standard did not cure properly and is therefore unusable as a binder thereby pointing to an advantage imparted by the preparation and use of a pre-reacted binder composition as described herein.

Figure 9:
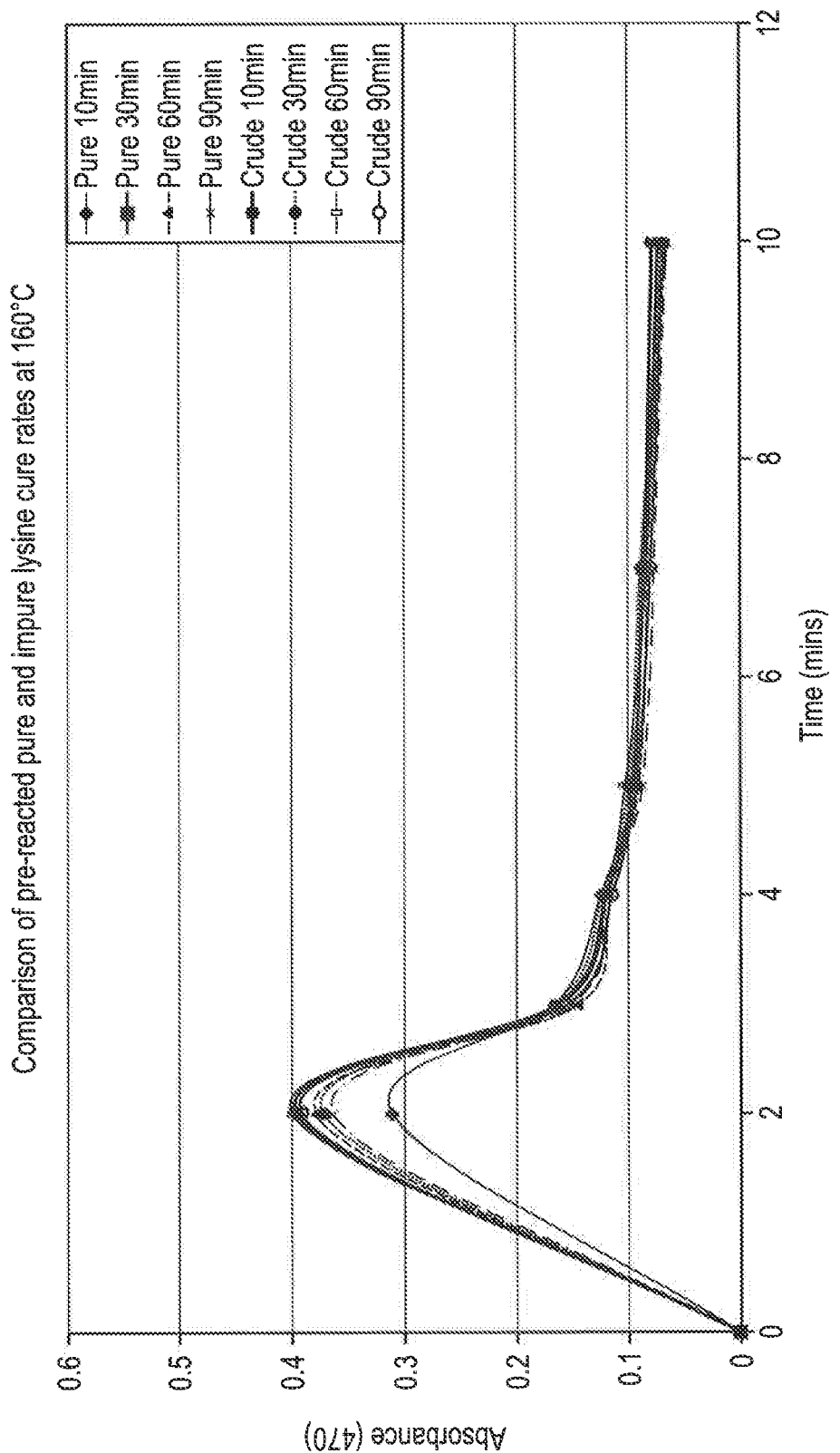
FIG. 9 shows: Comparison of cure rates at 160° C. for pre-reacted pure lysine-based binders versus pre-reacted impure (crude) lysine-based binders.
Figure 10:
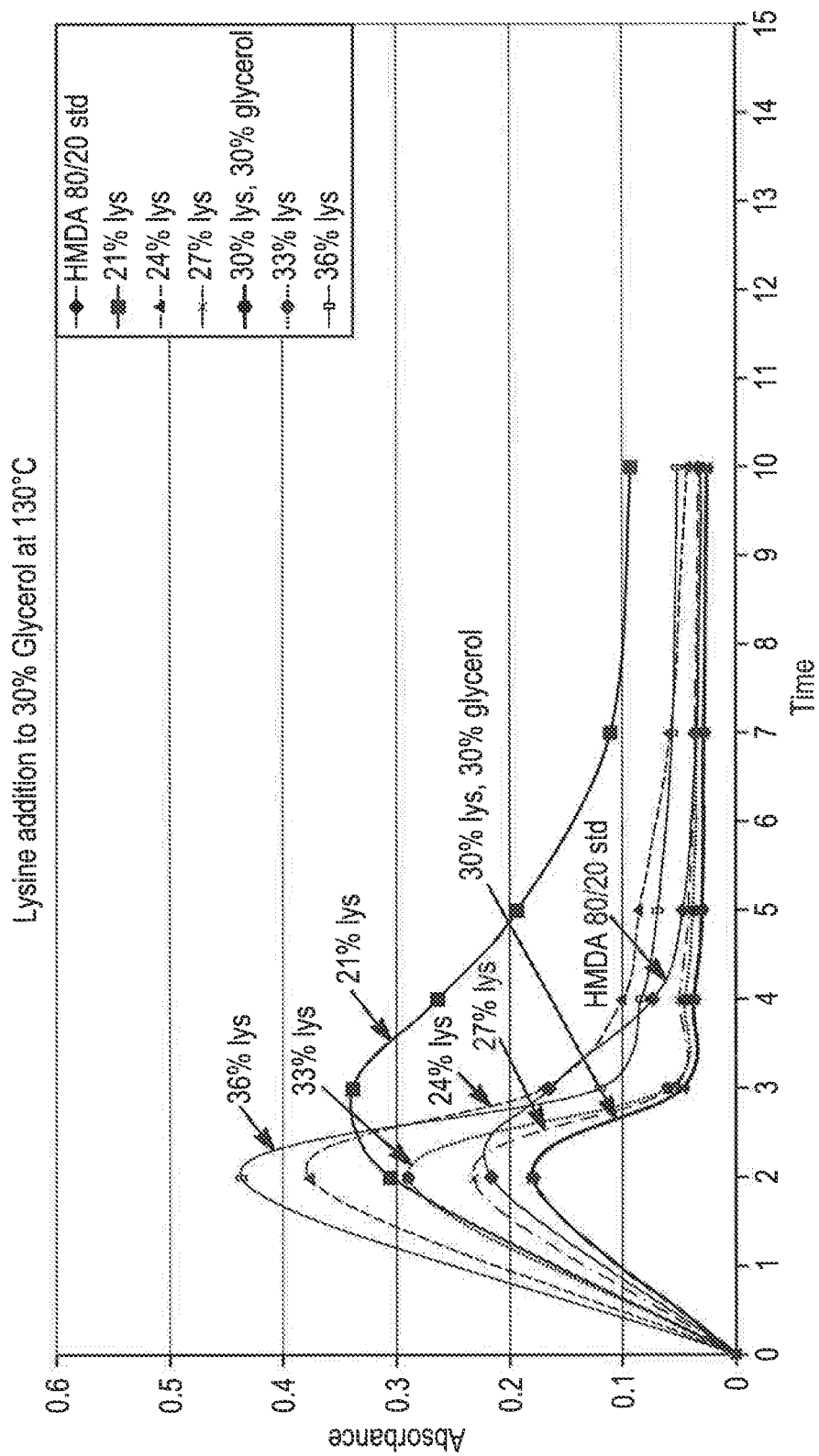
FIG. 10 shows: Comparison of cure rates for pre-reacted lysine-based binders containing 30% glycerol as a function of lysine concentration.
Figure 11:
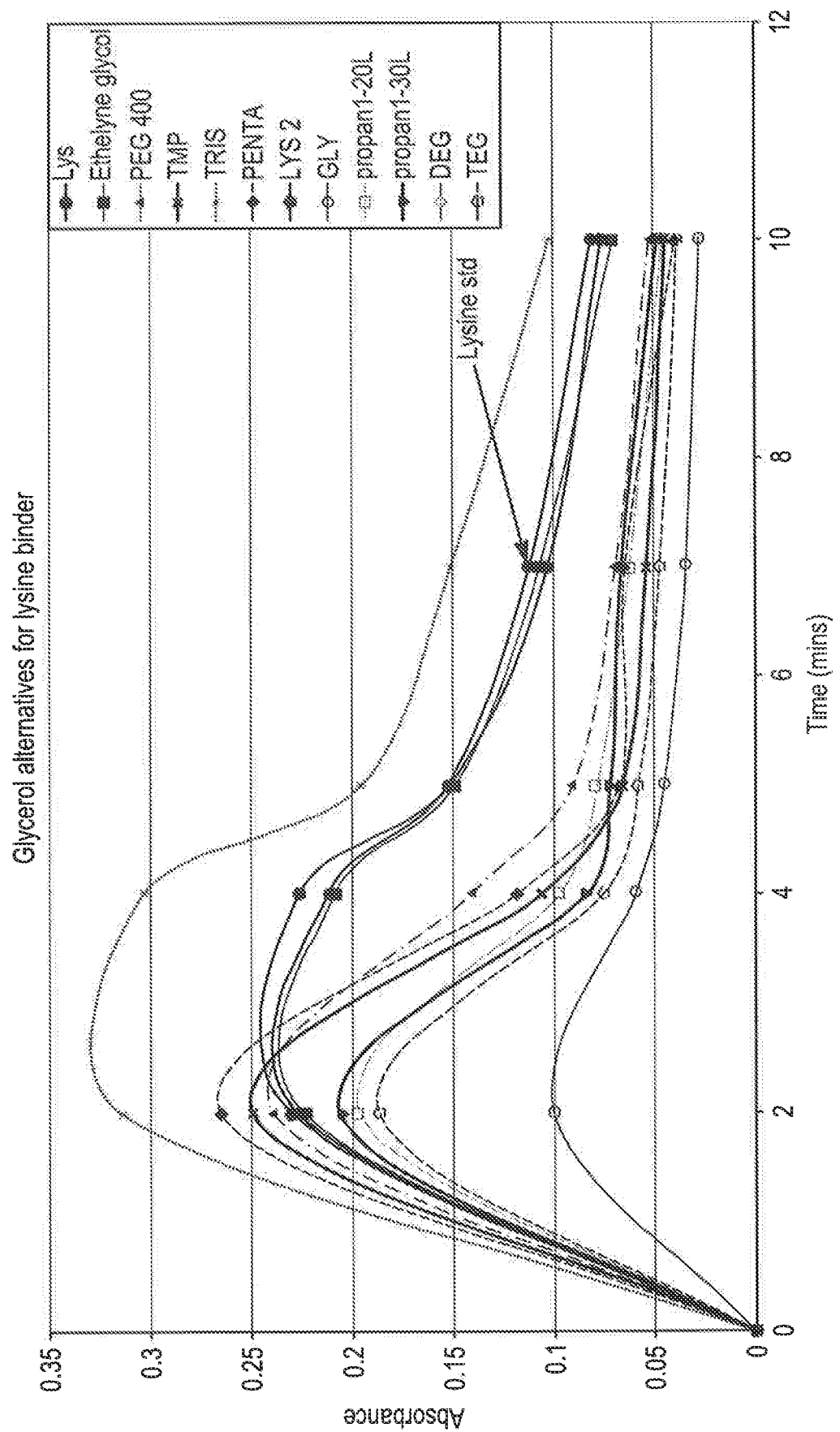
FIG. 11 shows: Comparison of cure rates for pre-reacted lysine-based binders containing 30% polyol as a glycerol alternative (several glycerol alternatives were screened that formed azeotropes)
Figure 12:
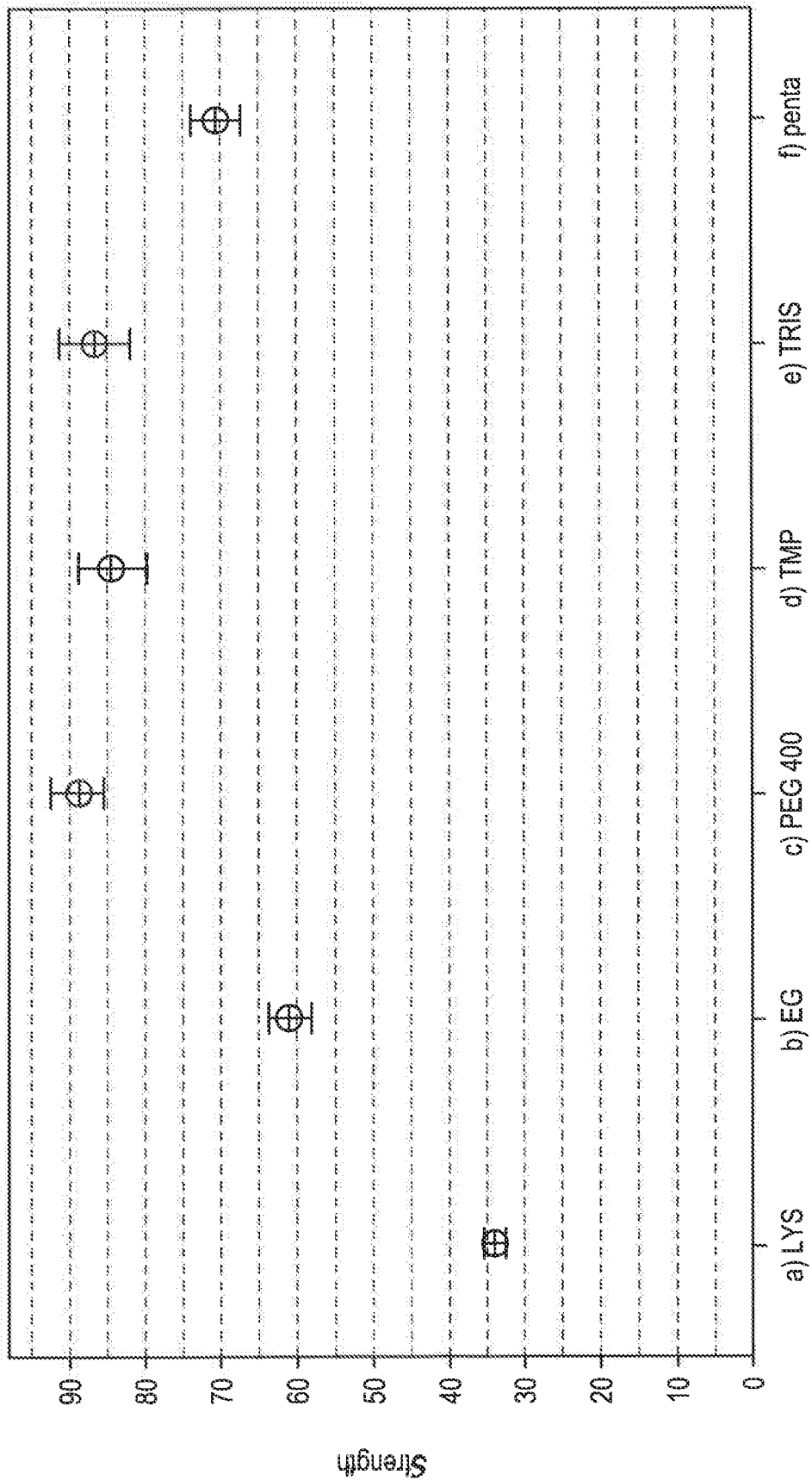
FIG. 12 shows: Comparison of bond strength improvements for pre-reacted lysine-based binders containing glycerol alternatives: ethylene glycol (EG), polyethylene glycol (PEG-400), trimethylolpropane (TMP), tris(hydroxymethyl) aminomethane (Tris), and pentaerythritol (determined via glass veil test)
Figure 13:
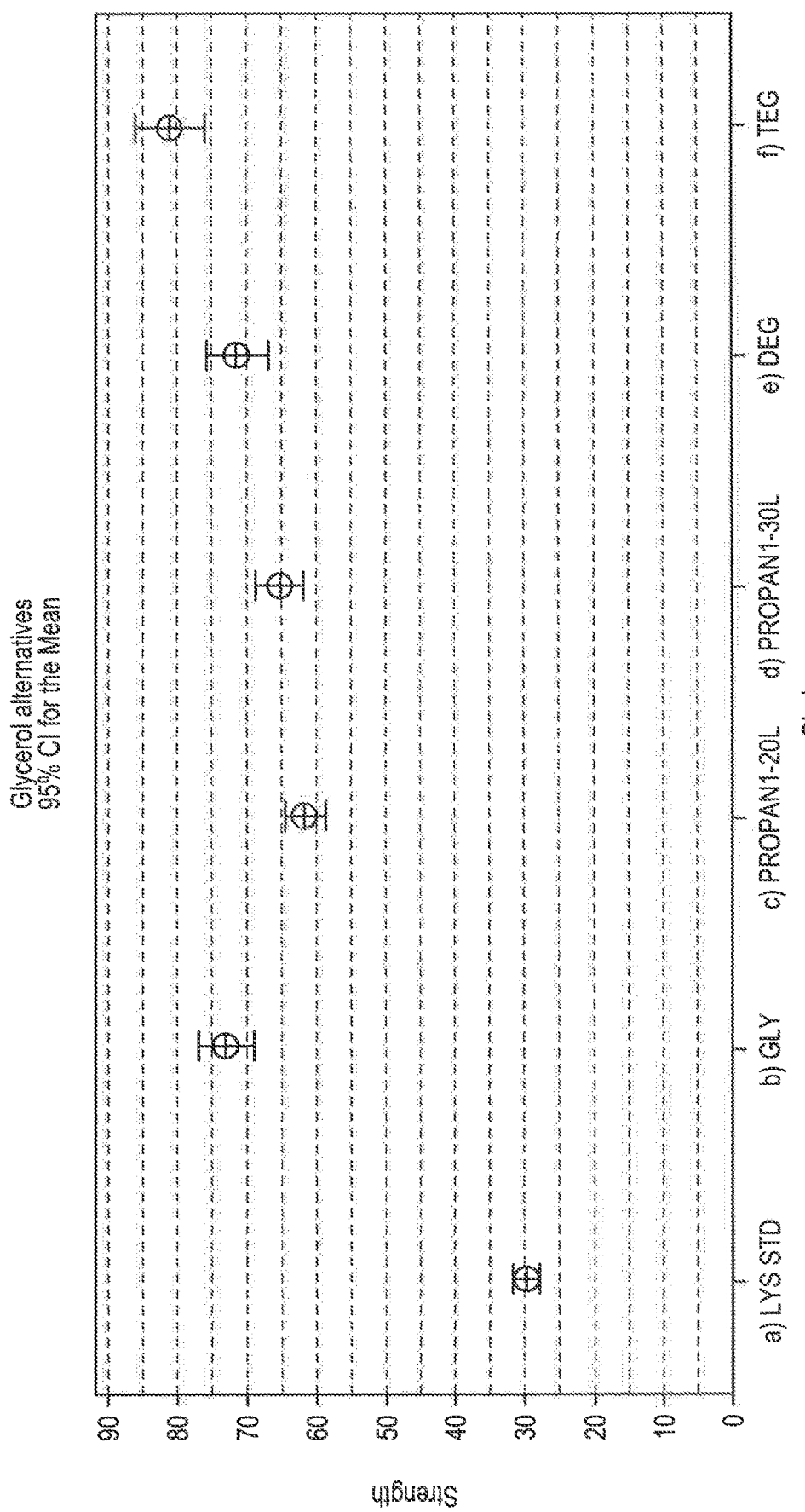
FIG. 13 shows: Comparison of bond strength improvements for pre-reacted lysine-based binders containing glycerol alternatives: glycine (Gly), propane-1,2-diol (propan1-2OL), propane-1,3-diol (propan1-3OL), diethyleneglycol (DEG), and triethylene glycol (TEG) (determined via glass veil test)

Example 6: Comparison of Cure Rates at 160° C. for Pre-Reacted Pure lysine-Based Binders Versus Pre-Reacted Impure (Crude) lysine-Based Binders As shown in FIG. 9, virtually identical cure rates were obtained from pre-reacted pure lysine-based binders versus pre-reacted impure (crude) lysine-based binders.

Example 7: Comparison of i) Cure Rates for Pre-Reacted lysine-Based Binders Containing 30% glycerol as a Function of lysine Concentration and ii) Cure Rates and Bond Strengths for Pre-Reacted lysine-Based Blinders Containing 30% polyol as a glycerol Alternative Whereas a Glucose/Lysine binder per se fails to provide good bond strength and cure rate, addition, i.e., inclusion, of one or more polyol compounds in such a binder formulation results in both greatly improved bond strength and cure rate (see FIG. 10, FIG. 11, FIG. 12, and FIG. 13).

Example 8: Preparation of Particle Board with Pre-Reacted Lysine-Containing Binder Formulations Binder Preparation Binder 1

1. Lysine binder was made up at a 65/35 (w/w) ratio of Xylose/Lysine at 70% starting solids (as per excel sheet below) in a 2 litre open top beaker and placed on a hot plate set to 300° C.

2. The binder was heated continually for approximately 10 minutes whilst under agitation to reduce foaming of the emitted CO2 gas, contents were weighed until the binder reached 90% of its starting solids then was left to cool to room temperature before being sealed in a bottle and left in a water bath set to 40° C. for 24 hours.

3. After 24 hours the binder was diluted to 63% solids to give a suitable viscosity for particle board production, boards were produced at 12 s/mm and 18 s/mm.

4. The 18 s/mm board was tested for Internal bond strength; there was no comparative un-prereacted xylose/lysine board to compare to as without pre-reaction the boards would not hold together even after curing for 30 simm.

Binder 2

5. Lysine binder was made up at a 32.5/32.5/35 (w/w) ratio of Glucose/Fructose/Lysine at 70% starting solids (as per excel sheet below) in a 2 litre open top beaker and placed on a hot plate set to 300° C.

6. The binder was heated continually for approximately 10 minutes whilst under agitation to reduce foaming of the emitted $CO_2$ gas, contents were weighed until the binder reached 90% of its starting solids then was left to cool to room temperature before being sealed in a bottle and left in a water bath set to 60° C. for 48 hours.

7. After 48 hours the binder was diluted to 63% solids to give a suitable viscosity for particle board production, boards were produced at 12 s/mm and 18 s/mm.

8. 18 s/mm board was tested for Internal bond strength, there was no comparative un-prereacted Glu/Fru/Lysine board to compare to as without pre-reaction the boards would not hold together even after curing for 30 s/mm.

| Piece | Weight (g) | Thickness (mm) | Density (kg/m³) | IB (N/mm²) |
|---|---|---|---|---|
| 1 | 16.07 | 10.05 | 639.602 | 0.193 |
| 3 | 16.58 | 9.90 | 669.899 | 0.248 |
| 5 | 17.18 | 9.95 | 690.653 | 0.301 |
| 8 | 16.36 | 9.85 | 664.365 | 0.282 |
| 11 | 17.12 | 9.95 | 688.241 | 0.316 |
| 15 | 17.06 | 9.90 | 689.293 | 0.267 |
| 22 | 17.21 | 9.80 | 702.449 | 0.297 |
| 24 | 17.21 | 10.05 | 684.975 | |
| 1 | 17.52 | 9.80 | 715.102 | 0.310 |
| 3 | 16.86 | 9.75 | 691.692 | 0.339 |
| 5 | 16.24 | 9.75 | 666.256 | 0.300 |
| 8 | 17.12 | 9.65 | 709.637 | 0.361 |
| 11 | 15.39 | 9.65 | 637.927 | 0.259 |
| 15 | 16.32 | 9.65 | 676.477 | 0.337 |
| 22 | 15.17 | 9.65 | 628.808 | 0.285 |
| 24 | 15.63 | 9.75 | 641.231 | 0.263 |

Figure 15:
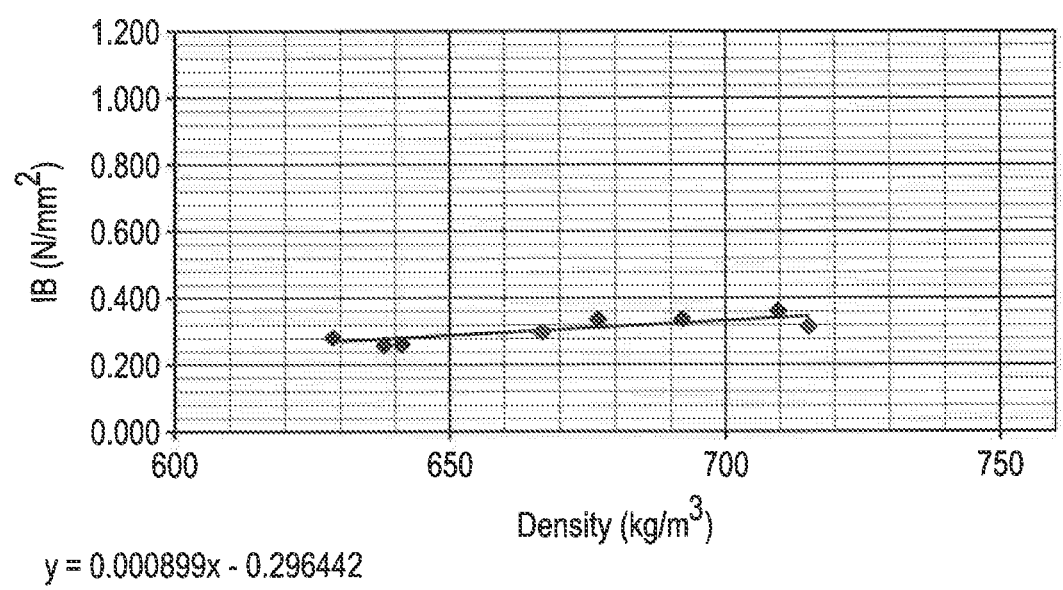
FIG. 15 shows: Internal bond strength as a function of density for particle board prepared with pre-reacted 32.5/32.5/35 Glucose/Fructose/Lysine binder formulation.

FIG. 14 shows the xylose/lysine binder to have an average IB of 0,23. FIG. 15 shows the Glucose/Fructose/lysine binder to have an average IB of 0.29. Both formulations without pre-reaction do not produce particle boards that hold together even after longer curing times. These data show that the pre-reaction of the binder improves bond strength such that a particle board of reasonable strength can be produced.

Example 9: Glass Veil Test

1. TEST METHOD 1.1. Binder Preparation

1) Carry out a standard solids test for 2 hours at 200° C. on the binder formulation(s) to be tested.

2) Using a glass beaker and distilled water, weigh out the required amount of binder components to give the projected baked out solids at 200° C. to target the desired glass veil LOI (as shown below).

| Binder baked out solids at desired curing temperature | Projected Veil LOI |
|---|---|
| 0.5% | ~3% |
| 1.0% | ~6% |
| 1.5% | ~9% |
| 2.0% | ~12% |
| 2.5% | ~15% |

3) Pour the binder solution into the glass veil dip tray; a minimum 300 g of binder solution is required to make 6 veils (3 for dry strength testing, 3 for weathered strength testing).

4) Lower solids binders (1.0% baked out solids) show better the effects of surface tension whilst higher solids binders (2.5% baked out solids) show better the differences between bonding strength.

1.2. Glass Veil Preparation

1) Using PF impregnated glass veil roll (ensure the end of the roll labelled R is on the right side), cut out A4 high (297 mm) size strips using a scalpel and 2 metre ruler ensuring the orientation of each strip is square to the machine direction of the roll.

2) Feed the right hand side of each strip into a guillotine and cut it into six A4 size pieces 297 mm×210 mm; each piece should be labelled according to its relative position to the right hand side of the roll, i.e., R1 being the veil first from the right, R2, R3, R4, R5 and R6 respectively.

3) Set a muffle furnace to 530° C.

4) Set the Mathis oven temperature to 200° C., dwell time to 8 minutes and fan speed to 700 rpm 5) Place 9 pre-cut A4 size PF impregnated glass veils from the same R numbered batch into the veil burnout frame, 1 per shelf. Each veil must be aligned in such a manner that it is set back a few mm from the edge of each individual shelf.

6) Place the prepared veil burnout frame into the muffle furnace for 30 minutes at 530° C., then remove to cool for a further 30 minutes.

7) Remove the bottom shelf of the frame first, carefully ensuring little or no contact of the glass veil with the inside edges of the frame and place on desk.

8) Take one A4 black Teflon mesh and tare its weight on a 2 dp balance, place this Teflon mesh on top of the removed glass veil/steel shelf and carefully turn it upside down and onto the balance so that the Teflon mesh is on the bottom and the steel shelf can now be removed from on top easily and placed to one side.

9) Record the burnt out veil weight and do not tare the balance.

10) Remove the Teflon sheet/veil from the balance and carefully immerse it into the binder solution in the dip tray ensuring complete saturation of the veil.

11) Remove and rotate the Teflon sheet/veil to remove excess binder (blue roll may be used to soak up binder within the mesh edges)

12) Weigh veil repeatedly during step 11 until total weight of the veil is within 13.8 g to 14.2 g. Record this weight.

13) Place the Teflon mesh/veil into the Mathis oven frame and cure for 8 minutes at 200° C.

Note. The Mathis oven steel frame must be at 200° C. prior to the veil being placed into it; this is to prevent cooling of the oven.

14) Remove Teflon mesh/veil after 8 minutes, tare balance and weigh the cured glass veil only, record weight and label veil or test immediately.

15) Repeat above steps until 6 veils have been prepared for each binder solution, the dip tray should be cleaned and dried before a new binder formulation is added to the drip tray.

1.3. Glass Veil Weathering

1) For Ammonium Sulphate/Ammonium Citrate veils; place the cured glass veils in a humidity cabinet set at 90% humidity and 50° C., remove veils after 16 hours. Before any testometric testing ensure veils are oven dried at 140° C. as moisture will affect the test.

2) For HMDA veils place into a water bath for 3 hours at 99° C. or the autoclave, before testing ensure veils are oven dried at 140° C. as moisture will affect the test.

1.4 Glass Veil Testing

1) Using the guillotine cut each A4 veil first into 2×A5 pieces and then into 8 strips, ensuring each set of 8 is labelled appropriately.

2) Attach the 50 Kg load cell and glass veil tensile plates to the testornetric machine and ensure a 100 mm gap between plates using a ruler.
3) Open "Glass veil tensile test" method and select "new test."
4) Ensure each sample is placed vertically in the grippers; within the rubber grip area, and the force is tared to zero. Follow onscreen instructions, and export data to a word report when testing is finished.
5) Base average strength and LOI calculation on data collected.

The invention claimed is:

1. A method of manufacturing a collection of matter bound by a polymeric binder composition comprising the steps:
   (i) providing a collection of matter,
   (ii) solvating a water-soluble, pre-reacted binder composition to produce a solution or dispersion, wherein the water-soluble, pre-reacted binder composition comprises the reaction product(s) of
      (a) at least one reducing sugar,
      (b) at least one polyamino acid component selected from the group consisting of lysine, an inorganic salt of lysine, and an organic salt of lysine, and
      (c) at least one additional component comprising a polyol, where the polyol is present in amount of 30 wt. % as a function of polyamino acid concentration and wherein the polyol is selected from the group consisting of glycerol, ethylene glycol, polyethylene glycol 400, trimethylolpropane, tris(hydroxymethyl) aminomethane, pentaerythritol, propane-1,2-diol, propane-1,3-diol, diethyleneglycol, and triethylene glycol,
   wherein the pre-reacted binder composition comprises at least one pre-polymer comprising at least 0.3 wt. % of the total weight of the polymeric binder composition,
   (iii) applying the solution or dispersion produced in step (ii) to the collection of matter, and
   (iv) applying energy to the collection of matter comprising the solution or dispersion to cure the polymeric binder composition.

2. The method of claim 1, wherein in step (ii) a cross-linker is added to the pre-reacted binder composition.

3. The method of claim 1, wherein the collection of matter comprises no polymeric binder composition prior to applying the solution or dispersion to the collection of matter.

4. The method of claim 1, wherein the pre-reacted binder composition comprises one or more compounds comprising a molecular weight of 10 kDa or less (low molecular-weight compounds), and which are different from (i) the at least one reducing sugar and (ii) the at least one polyamino acid component, and in which the low molecular-weight compounds comprise one or more of a glycolaldehyde, glyceraldehyde, 2-oxopropanal, acetol, dihydroxyacetone, acetoin, butanedione, ethanal, glucosone, 1-desoxyhexosulose, 3-desoxyhexosulose, 3-desoxy-pentosulose, 1,4-didesoxyhexosulose, glyoxal, methylglyoxal, diacetyl and 5-(hydroxymethyl)furfural.

5. The method of claim 1, in which an aqueous solution comprising 70 wt. % of the pre-reacted binder composition comprises a viscosity at 20° C. of no greater than 2000 cP as measured using a LV-Torque Brookfield Viscometer, spindle LV-63 at 60 rpm.

6. The method of claim 1, in which the viscosity of an aqueous solution containing 70 wt. % of the pre-reacted binder composition does not increase by more than 500 cP at 20° C. for 12 hours as measured using a LVTorque Brookfield Viscometer, spindle LV-63 at 60 rpm.

7. The method of claim 1, wherein the pre-reacted binder composition is capable of reacting with a cross-linker to yield one or more melanoidins as a water-insoluble composition.

8. The method of claim 1, wherein the at least one reducing sugar is selected from the group consisting of ribose, arabinose, xylose, lyxose, glucose (dextrose), mannose, galactose, allose, altrose, talose, gulose, idose, fructose, psicose, sorbose, dihydroxyacetone, tagatose and mixtures thereof.

9. The method of claim 1, wherein the weight ratio between the reducing sugar(s) and the polyamino acid component is 0.5:1 to 30:1.

10. The method of claim 1, wherein the collection of matter comprises matter selected from the group consisting of mineral fibers, slag wool fibers, stone wool fibers, glass fibers, aramid fibers, ceramic fibers, metal fibers, carbon fibers, polyimide fibers, polyester fibers, rayon fibers, cellulosic fibers, coal, sand, wood shavings, sawdust, wood pulp, ground wood, wood chips, wood strands, wood layers, jute, flax, hemp, straw, wood veneers, facings, wood facings, particles, woven materials and non-woven materials.

* * * * *